United States Patent
Donlan et al.

(10) Patent No.: US 10,042,718 B1
(45) Date of Patent: Aug. 7, 2018

(54) INCREMENTAL BACKUPS WHILE MINIMIZING MEDIA ACCESS

(71) Applicant: Amazon Technologies, Inc., Seattle, WA (US)

(72) Inventors: Bryan James Donlan, Seattle, WA (US); James Caleb Kirschner, Seattle, WA (US); Masataka Kubo, Seattle, WA (US); Colin Laird Lazier, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/280,944

(22) Filed: Sep. 29, 2016

(51) Int. Cl.
*G06F 12/00* (2006.01)
*G06F 11/14* (2006.01)
*G06F 3/06* (2006.01)

(52) U.S. Cl.
CPC ......... *G06F 11/1464* (2013.01); *G06F 3/065* (2013.01); *G06F 3/0608* (2013.01); *G06F 3/0619* (2013.01); *G06F 3/0652* (2013.01); *G06F 3/0686* (2013.01); *G06F 11/1451* (2013.01); *G06F 11/1461* (2013.01)

(58) Field of Classification Search
CPC ............ G06F 11/1464; G06F 11/1451; G06F 11/1461; G06F 3/0608; G06F 3/0619; G06F 3/065; G06F 3/0652; G06F 3/0686
See application file for complete search history.

(56) References Cited

U.S. PATENT DOCUMENTS

| | | | |
|---|---|---|---|
| 8,281,093 B1 * | 10/2012 | Krishnan | G06F 11/1469 711/162 |
| 2015/0081639 A1 | 3/2015 | Jin et al. | |
| 2017/0277596 A1 | 9/2017 | Kyathanahalli et al. | |
| 2017/0364415 A1 | 12/2017 | Formato et al. | |

* cited by examiner

*Primary Examiner* — Shawn X Gu
(74) *Attorney, Agent, or Firm* — Davis Wright Tremaine LLP

(57) ABSTRACT

Techniques for producing incremental short-term backups while minimizing media access are described herein. A backup request is received that specifies data to backup and a schedule for that backup. The data is then partitioned based on the schedule and, for each of the partitions, it is determined whether to store a full or incremental backup of that partition. Each partition is fully backed up once during a cycle of backups and incrementally backed up at other times. With each full backup of a partition, a reverse delta that can be used to reconstruct the previous full backup for that partition is stored with the full backup.

20 Claims, 17 Drawing Sheets

| | Week One | Week Two | Week Three | Week Four | Week Five | Week Six | Week Seven | Week Eight | Week Nine |
|---|---|---|---|---|---|---|---|---|---|
| Stride One | F/δ' | I | I | I | F/δ' | I | I | I | F/δ' |
| Stride Two | I | F/δ' | I | I | I | F/δ' | I | I | I |
| Stride Three | I | I | F/δ' | I | I | I | F/δ' | I | I |
| Stride Four | I | I | I | F/δ' | I | I | I | F/δ' | I |

FIG. 11

INCREMENTAL BACKUPS WHILE MINIMIZING MEDIA ACCESS

BACKGROUND

Modern computer systems are frequently implemented as distributed collections of computer systems operating collectively within one or more host computer system environments. Such computer systems typically utilize and produce large amounts of data, which must be archived or backed up so that various states of the computer system resources can be restored in the event of unforeseen losses. Long-term archival storage services may be used for data that is infrequently accessed and stored in redundant, or durable, storage for relatively long periods of time. Conversely, short-term storage services may be used for data that is frequently accessed or that requires less durability. Backup data may be infrequently accessed because the need to access it typically arises in an emergency. Conversely, backup data may be frequently or infrequently updated, either daily, weekly, monthly, or according to some other schedule. Backup data may also require high durability because, as mentioned previously, the need to access it typically arises in an emergency.

Problems with storage utilization or storage efficiency may arise with short-term storage of backup data such as, for example, for storing daily or weekly backups. Such problems may arise when the backup data it is stored using a long-term storage service as backup data is typically stored in archival storage. For instance, it may be difficult to fully utilize the storage resources in a cost-effective manner. Additionally, the relatively short lifetime of the data, compared to the relatively long time to prepare and store it may make such storage very inefficient. Additional problems may arise due to the resource costs of accessing data distributed across multiple archives. Such storage inefficiencies of short-term backup data may lead to increased costs of the distributed computer systems and poor resource utilization.

BRIEF DESCRIPTION OF THE DRAWINGS

Various techniques will be described with reference to the drawings, in which:

FIG. 11 illustrates an example diagram where additional data is processed and backup data is generated for incremental backups stored in archival storage;

DETAILED DESCRIPTION

Figure 1:
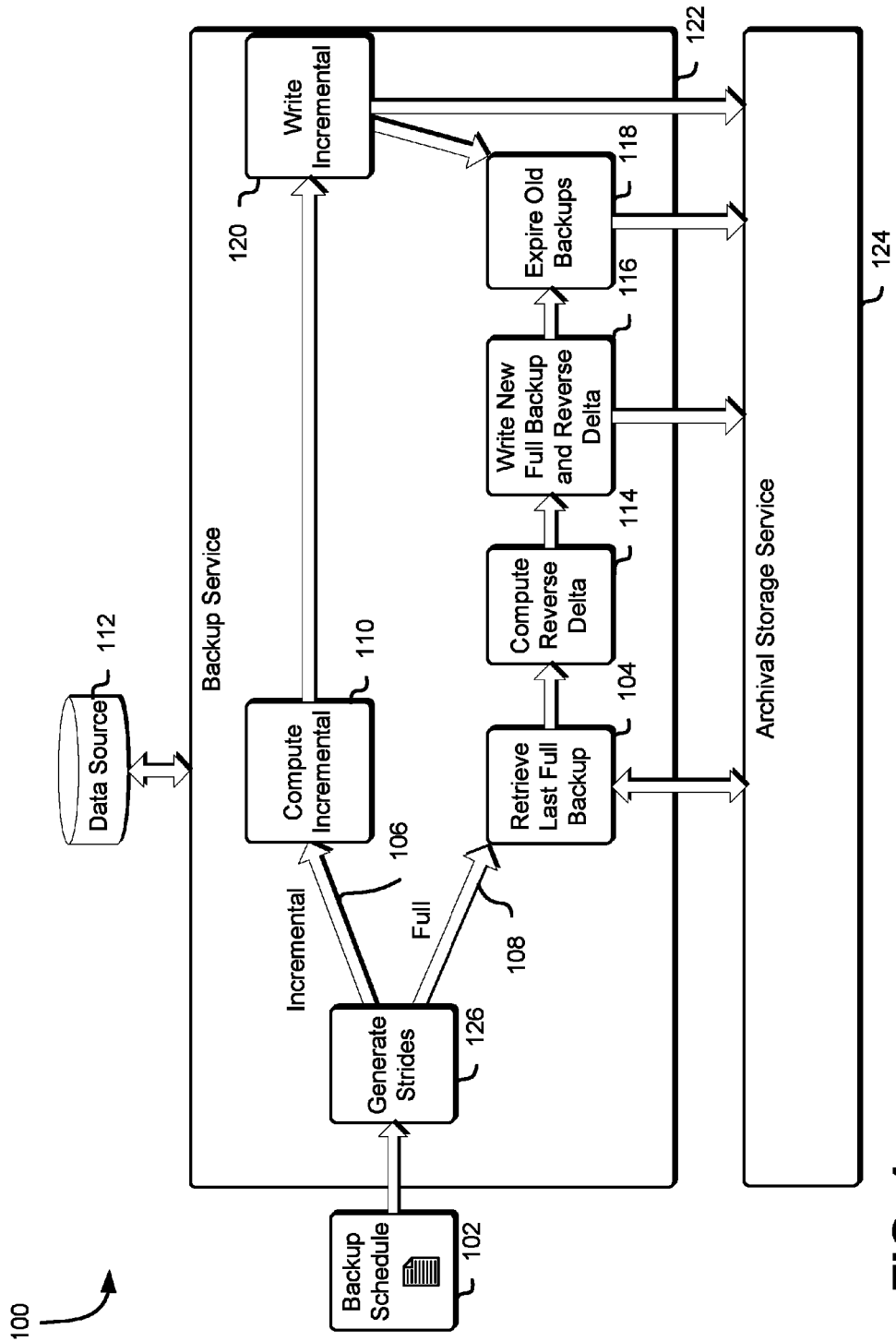
FIG. 1 illustrates an example environment where incremental backups are stored in archival storage.

The following disclosure describes techniques for utilizing characteristics of archival storage systems and services to increase the efficiency of storing short-term backups. A customer of a computing resource services provider that provides data storage and backup services may specify a backup schedule for the retention of the customer's data. As an example, consider a customer with a set of data that needs to be backed up on a regular basis. The set of data may include purchase records, or inventory data, or source code, or some other data. The customer might specify that a full backup of all of the data should be made every three months and that full backup should be retained indefinitely. The customer might also specify weekly backups that are retained for a month (i.e., for four weeks) and daily backups that are retained for a week (i.e., for seven days). Thus, at any time, the customer can restore data from any quarterly backup, from any week for the last four weeks, or from any day for the last week. In this example, the quarterly backup can be efficiently stored in long-term storage as a full backup, but the weekly and daily backups require processing in order to be stored efficiently.

The techniques described here take advantage of some properties of archival, or long-term, storage systems to store more ephemeral data such as short-term backups. One example of an archival storage system is a tape storage system. A tape storage system, described in more detail below, uses removable media (i.e., tapes) that can be mounted into tape drives. In an enterprise tape storage system, the tapes are typically mounted and unmounted using tape robots. One advantage of a tape storage system is that an arbitrary number of tapes can be associated with each tape drive and, correspondingly, with each tape rack because the tape media is removable. This property provides for highly concentrated data throughput at the tape drive or tape rack.

Using the example above, where a customer wants to have access to quarterly backups for an undetermined amount of time (e.g., for as long as the customer utilizes the provider's services for storage of backup data), weekly backups for a month, and daily backups for a week, it is first necessary for a backup system to have access to the data. The data can be sent to the backup system using, for example, a network, or the backup system may be provided with a locator for the data using, for example, a uniform resource identifier ("URI"). In the example described above, the data is at the customer's location but, as may be imagined, the data can come from any viable data source.

Once the data is provided to the backup service, the backup service processes the data to store it efficiently in an archival storage system. In the technique described here, the data is partitioned into approximately equal sections where the number of sections corresponds to the number of time periods in the highest level of short-term data. So, in the example above, the customer wants to have access to quarterly backups for an indefinite or undetermined amount of time, weekly backups for a month, and daily backups for a week. The quarterly backups that persist indefinitely are not considered short-term data so, in this example, there are four weekly backups in a month, meaning that the data should be partitioned into four approximately equal sections. Each section is referred to herein as a "stride." If, for example, a customer wanted to have access to weekly backups for thirteen weeks and daily backups for a week, the data would be partitioned into thirteen strides. One method for dividing the data into, for example, four strides, is to select the first quarter of the data as the first stride, the second quarter of the data as the second stride, and so on. Another method for dividing the data into, for example, four strides, is to select the first, fifth, ninth, etc. sectors of the data for the first stride, the second, sixth, tenth, etc. sectors of the data for the second stride, and so on.

After the data has been divided, it is determined whether to do a full backup of the stride to the archival storage system or to do an incremental backup of the stride to the archival storage system. An incremental backup of the stride is a backup of the data that has changed since either the previous full backup of the stride or since the previous incremental backup of the stride. Which type of incremental backup is chosen (i.e., from the previous full backup or from the previous incremental backup) depends on a number of factors and is discussed in more detail below. The determination of whether to do a full backup or an incremental backup is, in the example where the highest-level of short-lived backup is weekly backups for a month, depends on the week. In the first week, the first stride gets a full backup and the other strides (i.e., strides two, three, and four) get an incremental backup. In the second week, the second stride gets a full backup and the other strides get incremental backups. In the third week, the third stride gets a full backup and the other strides get incremental backups. In the fourth week, the fourth stride gets a full backup and the other strides get incremental backups. In the fifth week, the cycle repeats, with the first stride getting a full backup and the other strides getting incremental backups.

An incremental backup is created by storing the changes since the last backup (either full or incremental). So, in a simple example, if stride one, week one is "abcdefghij" and stride one, week two is "abcdffghij," then the incremental for stride one, week two is the change from "e" to "f" in the fifth position. Such a small change can be stored very efficiently. Additionally, for each full backup, a reverse incremental (or bi-directional incremental) is computed that allows the regeneration of the previous full backup for that stride. So, again using a simple example, if the full backup of stride one, week one is "abcdefghij" and the full backup of stride one, week five is "abcdefgggg," then the reverse incremental is the change from "ggg" to "hij" in the eighth position. The reverse incremental is also called a bi-directional incremental because if, for example, the reverse incremental is computed using an exclusive or ("XOR") operation then reproducing the full backup of stride one of week five from stride one of week one using the reverse incremental is essentially the same operation as reproducing the full backup of stride one of week one from stride one of week five using the reverse incremental.

By storing the reverse incremental with the full backup, earlier backups can be removed from the system. For example, if it is the ninth week of the backup cycle, and stride one is getting a full backup, then the full backup from week five can be marked for deletion from the storage system because, while that full backup is still needed to restore the data in weeks five through eight (which only have incremental backups), that full backup can be recreated from the full backup of week one and the reverse incremental. Additionally, old incremental backups can also be marked for deletion from the storage system as they are no longer needed. A backup that is marked for deletion may be immediately deleted or may be deleted the next time the storage device of the storage system is accessed. The pruning of incremental backups is more complex and is described in more detail below. Restoring the strides from the full backups, the reverse incremental backups, and the incremental backups are also described in more detail below, as is the storage of the daily backups.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 where incremental backups are stored in archival storage in accordance with an embodiment. In the example environment 100 illustrated in FIG. 1, a backup service 122 receives a backup schedule 102 that details a schedule for backups of a particular data source or sources. The backup schedule 102 may include a list of data sources to backup, one or more desired or required scheduled times for those backups, one or more desired lifetimes for those backups (i.e., how long the backup should be retained), the type of backup requested, and other data and/or metadata associated with the backup schedule 102. As an example, a backup schedule such as the backup schedule 102 specifies a data source such as the data source 112 and one or more schedules for backing up that data source. A first schedule may specify that the data source 112 should be fully backed up every three months (i.e., quarterly) and that those quarterly backups should be retained indefinitely. In the first schedule, the period of the backup (also referred to herein as a "backup period"), which is a time duration, is three months because the backup of the data should occur every three months and the durability of the backup (also referred to herein as a "backup durability"), which is also a time duration, is indefinite. A second schedule may specify that the data source 112 should be fully backed up weekly and that those weekly backups should be retained for four weeks. In the second schedule, the backup period is a week and the backup durability is four weeks. A third schedule may specify that the data source 112 should be incrementally backed up daily and that those daily backups should be retained for a week. In the third schedule, the backup period is a day and the backup durability is a week (or seven days). Such a backup schedule allows the data to be recovered any day for the past week, any week for the past four weeks, or any quarter indefinitely. As long as the backup durability is not indefinite, the backup durability for each schedule is a positive integer multiplier of the backup period. So, for example, the backup period of the second schedule is one week and the backup durability is four weeks. In this case, the integer multiplier is four.

It should be noted that, when performing backups of computer system data, the speed at which backup data is accessible is important in many contexts. For example, when a primary data source has been lost, a backup dataset may be used to restore the primary data source at a restore time associated with that restore operation. In some cases, a request for the backup data can come at any time, and can often result in problems with, or failure of, some other system or service. A backup dataset (also referred to herein simply as a "backup") may be long-term (i.e., stored for a long period of time) or short-term (i.e., stored for a shorter period of time). A long-term backup is infrequently accessed, long-lived, and is often durably or redundantly stored so that it may be recovered for some amount of time (e.g., an amount of time required to comply with legal regulations). For example, a quarterly backup that persists for an indefinite period of time (i.e., that has an indefinite or unspecified backup durability) is an example of a long-term backup. However, short-term backups also exist such as, for example, weekly backups that are stored for a month or daily backups that are stored for a week. Such short-term backups can be inefficient to store and access because resource usage to prepare the backup, write the backup, and retrieve the backup, if needed, can quickly overwhelm any measure of efficiency. For example, if it takes six hours of drive access time to prepare and store a backup that persists for three years, the preparation time is a minimal percentage. Conversely, if it takes six hours of drive access time to prepare and store a backup that persists for one week, the proportion of time spent in preparation becomes more significant.

It should also be noted that, unless otherwise specified or made clear by context, as used herein, an "incremental" backup refers to an individual backup of a scheduled set of backups. So, for example, the second full weekly backup of a four week backup cycle (i.e., a weekly backup from two weeks ago that is retained for four weeks) is an incremental backup. However, an incremental backup may also refer to a partial backup that is generated from a previous full backup or from a previous incremental backup. Such a partial incremental backup includes only the differences from the previous backup to the current backup as described herein. Where such an incremental backup is used to refer to such a partial backup, it will be explicitly stated or made clear by context. Such incremental backups may also be referred to herein as "incremental backups" or "deltas."

The backup service 122 may be a collection of computing resources that operate collectively to process requests to store and/or access backup data. The computing resources configured to process requests to store and/or access backup data include at least one of: computer systems (i.e., the computer systems including processors and memory), networks, storage devices, executable code, services, processes, modules, or applications. The computing resources configured to process requests to store and/or access backup data may also include virtual systems that are implemented on shared hardware hosted by, for example, a computing resource service provider. The backup service 122 may be implemented as a single system or may be implemented as a distributed system, with a plurality of instances operating collectively to process requests to store and/or access backup data. The backup service 122 may operate using computing resources (e.g., databases) that enable the backup service 122 to locate and retrieve backup data quickly and to allow backup data to be provided in response to requests for the backup data (e.g., restore requests).

For example, the backup service 122 may maintain stored backup data in a manner such that, when a request to restore a set of backup data is received, the backup data can be located and provided (or streaming data object can be initiated) in a response to the request. The request to restore a set of backup data may specify a restore time, which is a time within the backup durability to restore the data to. A restore time (also referred to as a "restore point") is the selected time that the data should be restored to. So, for example, a restore time could be three days ago which would cause the data to be restored to the backup from three days ago.

As noted, backup data stored in the backup service 122 may be organized into data objects. The data objects may have arbitrary sizes except, in some embodiments, may have constraints on size or durability. Thus, the backup service 122 may store numerous data objects of varying sizes. The backup service 122 may store the numerous data objects in storage resources controlled by the backup service 122, may cause the numerous data objects to be stored using resources controlled by some other service, or may use a combination of these storage locations. The backup service 122 may also cause the numerous data objects to be redundantly stored using some redundancy encoding technique, may cryptographically encode the numerous data objects, or may use a combination of these and/or some other data preprocessing techniques. The backup service 122 may also operate as a key value store that associates data objects with identifiers of the data objects that may be used by a user to retrieve or perform other operations in connection with the data objects stored by the backup service 122. The backup service 122 may also generate metadata associated with the data objects that may be stored with the data objects.

When the backup service 122 receives the backup schedule 102, the backup service 122 may first analyze the backup schedule 102 to determine the scope and type of backup that is being requested, as described below. The backup service 122 may retrieve the last full backup 104 from the archival storage service 124. As used herein, the term "last full backup" denotes the most recent full backup. That is, a full backup is the last full backup until a more recent full backup is produced according to the backup schedule 102. The last full backup 104 retrieved from the archival storage service 124 is, in the example illustrated in FIG. 1, a last full backup of each stride, as described below. The last full backup may be retrieved from the archival storage service 124 when it is needed to, for example, compute incremental backups (i.e., deltas from the previous full backup), or compute reverse deltas (described below). In the example illustrated in FIG. 1, the last full backup is retrieved from the archival storage service 124 for any full backup. The last full backup may also be retrieved from the archival storage service 124 for a partial (or incremental) backup. In an embodiment, partial backups are generated from the last full backup so that, for example, if there is a full backup on day one, the partial (or incremental) backup of day two is generated from the last full backup from day one and the changes since that last full backup and the partial (or incremental) backup of day three is also generated from the last full backup from day one and the changes since that last full backup. In another embodiment, partial backups are computed from previous partial backups so that, for example, if there is a full backup on day one, the partial (or incremental) backup of day two is generated from the last full backup from day one and the changes since that last full backup but the partial (or incremental) backup of day three is generated from the partial backup from day two and the changes since that partial backup.

It should be noted that, in the examples illustrated herein, the backup schedule 102 is illustrated as being delivered to, or provided to, the backup service 122. In an embodiment, the backup schedule 102 is a new backup schedule that must be analyzed by the backup service 122, as described below, and the scheduled backups in the backup schedule are added to a list of backups maintained by the backup service. In another embodiment, the backup schedule 102 is a previously received backup schedule that is stored by the backup service 122 and used to generate backups according to the schedule. For example, a backup schedule that specifies that a data source should be fully backed up every three months (i.e., quarterly) and that those quarterly backups should be retained indefinitely, that specifies that the data source should be fully backed up weekly and that those weekly backups should be retained for four weeks, and that specifies that the data source should be incrementally backed up daily and that those daily backups should be retained for a week may have been previously received by the backup service 122 and stored therein. The quarterly, weekly, and daily backups are then scheduled by the backup service 122 and repeatedly performed until the schedule is changed.

As with the backup service 122, the archival storage service 124 may be a collection of computing resources that operate collectively to process requests to store and/or access archival data. The computing resources configured to process requests to store and/or access archival data include at least one of: computer systems (the computer systems including processors and memory), networks, storage devices, executable code, services, processes, modules, or applications. The computing resources configured to process requests to store and/or access archival data may also include virtual systems that are implemented on shared hardware hosted by, for example, a computing resource service provider. The archival storage service 124 may be implemented as a single system or may be implemented as a distributed system, with a plurality of instances operating collectively to process requests to store and/or access archival data. The archival storage service 124 may operate using computing resources (e.g., databases) that enable the archival storage service 124 to locate and retrieve archival data quickly, to allow archival data to be provided in response to requests for the archival data.

For example, the archival storage service 124 may maintain stored archival data in a manner such that, when a request to retrieve a set of archival data is received, the archival data can be located and provided (or streaming data object can be initiated) in a response to the request. As noted, archival data stored in the archival storage service 124 may be organized into data objects. The data objects may have arbitrary sizes except, in some embodiments, may have constraints on size or durability. Thus, the archival storage service 124 may store numerous data objects of varying sizes. The archival storage service 124 may store the numerous data objects in storage resources controlled by the archival storage service 124, may cause the numerous data objects to be stored using resources controlled by some other service, or may use a combination of these storage locations. The archival storage service 124 may also cause the numerous data objects to be redundantly stored using some redundancy encoding technique, may cryptographically encode the numerous data objects, or may use a combination of these and/or some other data preprocessing techniques. The archival storage service 124 may also operate as a key value store that associates data objects with identifiers of the data objects that may be used by a user to retrieve or perform other operations in connection with the data objects stored by the archival storage service 124. The archival storage service 124 may also generate metadata associated with the data objects that may be stored with the data objects.

The backup service retrieves the data to be backed up from the data source 112 and generates strides 126 from that data. When the backup service 122 generates strides 126 from the data, the backup service 122 partitions the data based at least in part on the backup schedule 102. The strides 126 collectively contain sufficient information to reproduce the data to be backed up, but each individually does not have sufficient information to reproduce the data to be backed up. In an embodiment, the strides 126 are a disjoint partitioning of the data to be backed up. In another embodiment, the strides 126 are not a disjoint partition and they may contain overlapping data. In another embodiment, the strides 126 are padded with additional data to increase their sizes to, for example, make them all identical in size.

The backup service 122 first determines how many strides are required based on the backup period and backup durability of the highest-level short-term backup in the schedule. So, using the example above with a backup schedule that specifies that a data source should be fully backed up every three months (i.e., quarterly) and that those quarterly backups should be retained indefinitely, that specifies that the data source should be fully backed up weekly and that those weekly backups should be retained for four weeks, and that specifies that the data source should be incrementally backed up daily and that those daily backups should be retained for a week, the highest-level backup in the schedule (i.e., the one with the longest retention) is the quarterly backups that should be retained indefinitely. However, that backup is not a short-term backup because of the retention length. Thus, the highest-level short-term backup in the schedule is the weekly backups that are retained for four weeks. In this example, the backup period of the highest-level short-term backup is one week and the backup durability of the highest-level short-term backup is four weeks. Consequently, the integer multiplier is four, for the four sets of one week and so the number of strides is also four. In another example, for a backup schedule with a highest-level short-term backup that specifies that a data source should be fully backed up every day, and that those backups should be retained for ten days, the integer multiplier for the highest-level short-term backup would be ten, for the ten day backup durability and one day backup period. Accordingly, the number of strides would also be ten.

Based on the number of strides, the data that is scheduled for backup is divided into that number of strides. So, for example, when the backup service 122 generates the strides, the backup service 122 generates, from data to backup, a plurality of data sets (i.e., the strides 126) that collectively contain sufficient information to reproduce the set of data to backup. However, each data set of the plurality of data sets (i.e., the strides 126) may individually have insufficient information to obtain the set of data to backup. In an embodiment, the backup service 122 selects the first portion of the data that is scheduled for backup in the first stride, the second portion of the data that is scheduled for backup in the second stride, and so on. For four strides, the first quarter of the data is in stride one, the second quarter of the data is in stride two, the third quarter of the data is in stride three, and the fourth quarter of the data is in stride four. In another embodiment, the backup service 122 selects every $n^{th}$ subset of the data, for some subset size, and assigns that subset to a corresponding stride. So, for example, with four strides, the backup service 122 may select every fourth sector of the data and assign that sector to the corresponding stride. In this example, the first sector is assigned to the first stride, the second sector is assigned to the second stride, the third sector is assigned to the third stride, the fourth sector is assigned to the fourth stride, the fifth sector is assigned to the first stride, the sixth sector is assigned to the second stride, and so on. In such an embodiment, the sectors are assigned using modulo arithmetic based on the number of strides. In such an embodiment, the size of the subsets of the data can be any arbitrary and/or convenient size such as, for example, sectors, bytes, kilobytes, megabytes, etc.

The size of the subsets of the data may be selected based on improving or optimizing storage efficiency in the archival storage service 124 (i.e., the archival storage service 124 may be optimized for certain data sizes and the size of the subsets of the data may be based at least in part on those certain data sizes). Such optimizations may be based on data throughput to the archival storage service 124, the type of media used in the archival storage service 124, the method of redundant encoding used in the archival storage service 124, or a combination of these and/or other such factors. In an embodiment, the size of the subsets of the data may be determined by iteratively analyzing performance and/or efficiency of the archival storage service and tuning the size of the subsets accordingly using, for example, a machine learning algorithm.

The backup service 122 next performs operations to determine, for each stride, whether a full backup 108 or an incremental backup 106 of the stride is needed. As described herein, for a backup with four strides and an integer multiplier of four, every fourth backup for a particular stride is a full backup, and the intervening three backups are incremental backups. So, for example, with four strides and a durability of four weeks (e.g., weekly backups that are retained for four weeks), the first stride may have a full backup in the first week, a partial incremental backup in the second week that is generated from the full backup of the first week, a partial incremental backup in the third week that is also generated from the full backup of the first week, a partial incremental backup in the fourth week that is also generated from the full backup of the first week, and another full backup in the fifth week. Similarly, the second stride may have a partial incremental backup in the first week (which may be based on a null set, as described below), a full backup in the second week, a partial incremental backup in the third week that is generated from the full backup of the second week, a partial incremental backup in the fourth week that is also generated from the full backup of the second week, and a partial incremental backup in the fifth week that is also generated from the full backup of the second week. Accordingly, each week one stride has a full backup and the other strides have partial incremental backups and, over the course of the durability (e.g., four weeks), each stride has one full backup and three incremental backups.

If the backup service 122 is generating an incremental backup 106 for the particular stride, the backup service 122 may first use the last full backup for that stride to compute an incremental 110, or incremental backup, for that stride. So, as described above, the last full backup 104 retrieved from the archival storage service 124 includes the last full backup for each of the strides, where each of the last full backups may be retrieved for a different week (e.g., in week eight, the last full backup of stride one is from week five, the last full backup of stride two is from week six, the last full backup of stride three is from week seven, and the last full backup of stride four is from week four). The incremental 110 for a stride may be computed by determining the differences between the last full backup of the stride and the current data (i.e., the data that is being backed up) for the stride. In an embodiment, the incremental 110 for a stride is computed by comparing the current data and the last full backup. In another embodiment, the incremental 110 for a stride is computed by performing a mathematical operation such as, for example, an exclusive or ("XOR") on the last full backup and the current data. In the examples illustrated herein, an XOR operation is merely used as an example operation which can, in some embodiments, be replaced by subtraction or some other operation. Once the incremental 110 is computed, the backup service 122 may write 120 the incremental for the stride to the archival storage service 124 and may then expire old backups 118, as described below.

If the backup service 122 is generating a full backup 108 for the particular stride, the backup service 122 may first retrieve the previous full backup 104, as described above, to compute a reverse delta 114. As used herein, a "reverse delta" is computed by determining the differences between the current data (i.e., the data that is being backed up) and the previous full backup for the stride. In other words, while a delta shows the differences to the current data since the last full backup and allows the data to be reproduced from the last full backup and the delta, the reverse delta shows the changes to the current data (in this case, what would be the next full backup) to reconstruct (or reproduce) the last full backup. The reverse delta, once generated from the full backup and the previous full backup, includes data that may be stored in the archival storage with the full backup. The data of the reverse delta may then be combined with the full backup to reconstruct the previous full backup. As an example, a "diff" operation shows the differences between two sets of data. The result of a diff between a full backup and the previous full backup may be stored in archival storage. The diff can then be combined with the full backup to reconstruct the previous full backup.

The reverse delta 114 for a stride may be computed by determining the differences between the current data (i.e., the data for the stride that is being backed up with a full backup) and the last full backup of the stride. In an embodiment, the reverse delta 114 for a stride is computed by comparing the current data and the last full backup. In another embodiment, the reverse delta 114 for a stride is computed by performing a mathematical operation such as, for example, an exclusive or ("XOR") or some other such operation on the last full backup and the current data. The reverse delta 114 may also be referred to herein as a "bi-directional delta" in that, if the reverse delta 114 is computed using reversible operation such as, for example, XOR, the bi-directional delta may be used to produce the last full backup from the current data and may also be used to produce the current data from the last full backup. The bi-directional delta, once generated from the full backup and the previous full backup, includes data that may be stored in the archival storage with the full backup. The data of the bi-directional delta may then be combined with the full backup to reconstruct the previous full backup. As an example, an "XOR" operation shows the differences between two sets of data. The result of an XOR between a full backup and the previous full backup may be stored in archival storage. The XOR can then be applied (i.e., combined) with the full backup to reconstruct the previous full backup or combined with the previous full backup to reconstruct the full backup. Once the reverse delta 114 is computed, the backup service 122 may write 116 the full backup and the reverse delta for the stride to the archival storage service 124 and may also expire old backups and deltas 118.

Expiring old backups and deltas 118 is the process of determining which previously stored backups and deltas (including reverse deltas) are no longer required to restore backup data. For example, in week five, when a new full backup for stride one is stored in the archival storage service 124, the previous full backup from week one for stride one is no longer needed. Similarly, in week seven, when the backups for weeks one, two, and three are no longer needed, some of the incremental backups for those weeks can be expired. The process of expiring old backups and deltas 118 is described in more detail below.

Although not illustrated in FIG. 1, the backup service 122 and/or the archival storage service 124 may generate metadata associated with the backup schedule and/or the various components of the backups (e.g., the contents of the strides, how the strides are generated, or the amount of changes in a particular delta) and may store this metadata in storage associated with the backup service 122, in storage associated with the archival storage service 124, or with the data objects stored in the archival storage service 124.

Figure 2:
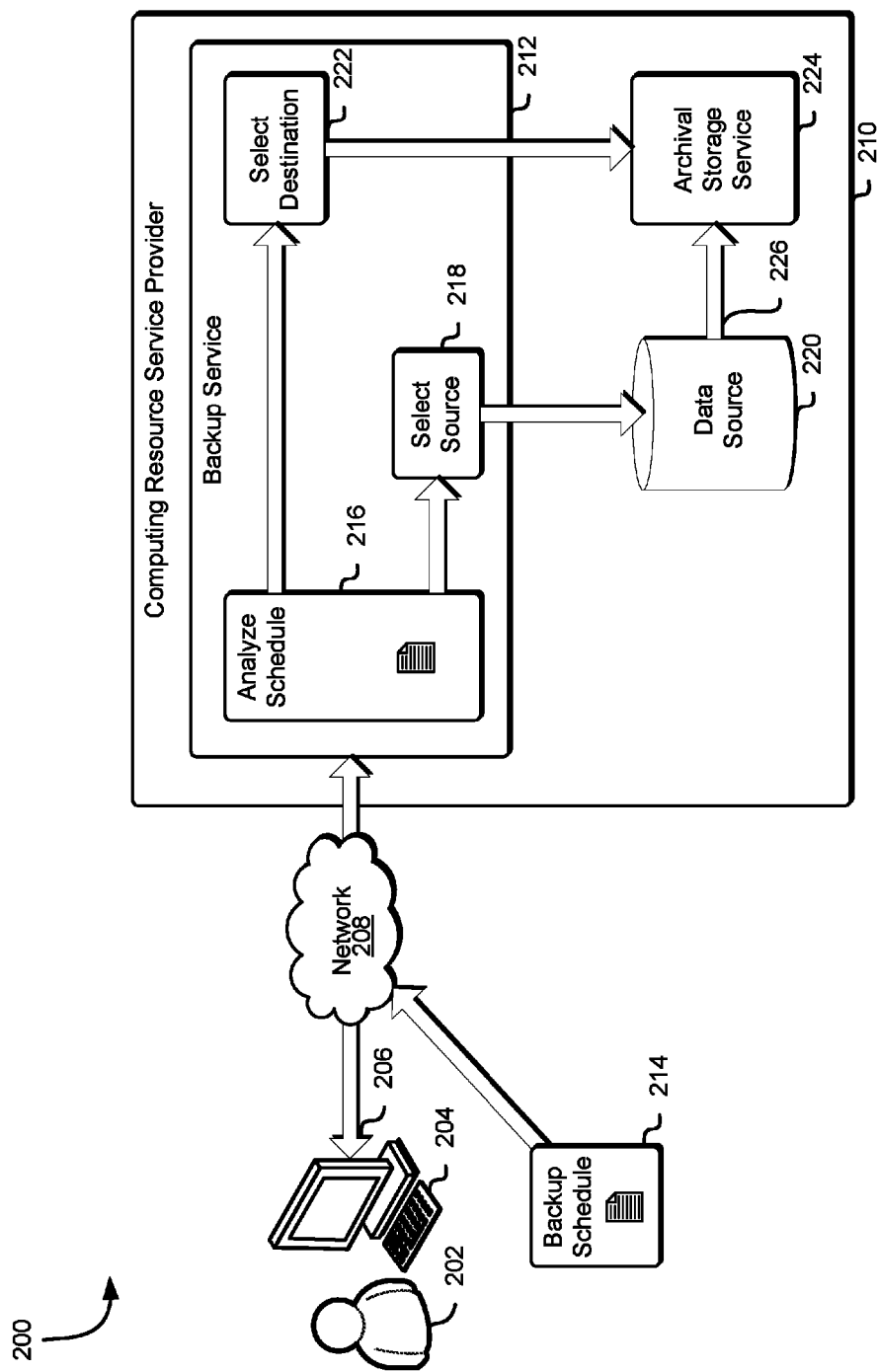
FIG. 2 illustrates an example environment where scheduled backups are analyzed using a backup service and the backups are stored in archival storage.

FIG. 2 illustrates an example environment 200 where scheduled backups are analyzed using a backup service and the backups are stored in archival storage, as described in connection with FIG. 1, and in accordance with an embodiment. In the example environment 200 illustrated in FIG. 2, a user 202 may use a client computing device 204 to connect 206 to a variety of services provided by a computing resource service provider 210. The user 202 may use the client computing device 204 to connect 206 to the computing resource service provider 210 over a network 208 such as those networks described herein. The computing resource service provider 210 may provide a distributed, virtualized, and/or datacenter environment within which one or more applications, processes, services, virtual machines, and/or other such computer system entities may be executed. The user 202 may be a person, or may be a process running on one or more remote computer systems, or may be some other computer system entity, user, or process.

Commands from the user 202 to the computing resource service provider 210 may originate from an outside computer system or from within the computing resource service provider environment. The commands to connect 206 to the computing resource service provider 210 may be sent to the computing resource service provider 210 and/or the services operating in the environment therein, without the direct intervention of the user 202 (i.e., commands to connect 206 to the computing resource service provider 210 may be generated automatically in response to one or more events). The user 202 may be a privileged user associated with a customer of the computing resource service provider 210. The user 202 may also be a privileged user associated with the computing resource service provider 210.

The computing resource service provider 210 may provide access to one or more host machines, may provide access to one or more virtual machine instances as may be operating thereon, or may provide access to one or more services in an environment therein. The one or more services provided by the computing resource service provider 210 may also be implemented as and/or may utilize one or more virtual machine instances as may be operating on host machines operating within the computing resource service provider 210 environment. For example, the computing resource service provider 210 may provide a variety of services to users including, but not limited to, the user 202, and the users may communicate with the computing resource service provider 210 via an interface such as a web services interface or any other type of interface. While the example environment illustrated in FIG. 2 shows a single connection or interface to the computing resource service provider 210, each of the services operating in an environment therein may have its own interface and, generally, subsets of the services may have corresponding interfaces in addition to or as an alternative to the single interface.

In an example of a type of service operating within the environment of the computing resource service provider 210, a virtual computer system service may be a collection of computing resources configured to instantiate virtual machine instances on behalf of a customer such as the user 202. The customer may interact with a virtual computer system service (via appropriately configured and authenticated API requests) to provision and operate virtual machine instances that are instantiated on physical computing devices hosted and operated by the computing resource service provider 210. The virtual computer system service may also be configured to manage virtual machine instances to, for example, instantiate virtual machine instances and/or to manage the migration of virtual machine instances. The virtual machine instances may be used for various purposes, such as to operate as servers supporting a web site, to operate business applications or, generally, to serve as computing power for the customer. Other applications for the virtual machine instances may be to support database applications, electronic commerce applications, business applications, and/or other applications.

As described above, a backup service 212 of a computing resource service provider 210 may first receive a backup schedule 214 that, in the example illustrated in FIG. 2, is provided by the user 202 using the client computing device 204 used to connect 206 to the computing resource service provider 210 over a network 208. The backup service 212 may first analyze 216 the schedule as described herein and, as a result of that analysis may select the source 218 for the data that is to be backed up according to the backup schedule 214 and may also select a destination 222 for the data that is to be backed up according to the backup schedule 214. In the example illustrated in FIG. 2, the source for the data that is to be backed up is the data source 220, which is located within the computing resource service provider environment. In an embodiment, the data source 220 is located within a computing environment of the user 202. In another embodiment, the data source 220 is located within a computing environment of a third party. In yet another embodiment, the data source 220 is a distributed data source and is located in a combination of locations including, for example, a computing resource services provider environment, a user computing environment, and/or a third-party computing environment.

In the example illustrated in FIG. 2, the destination for the data that is to be backed up is the archival storage service 224, which is the same as the archival storage service described at least in connection with FIG. 1. At the scheduled time for the backup, data from the data source 220 is provided 226 to the archival storage service 224 as described herein.

Figure 3:
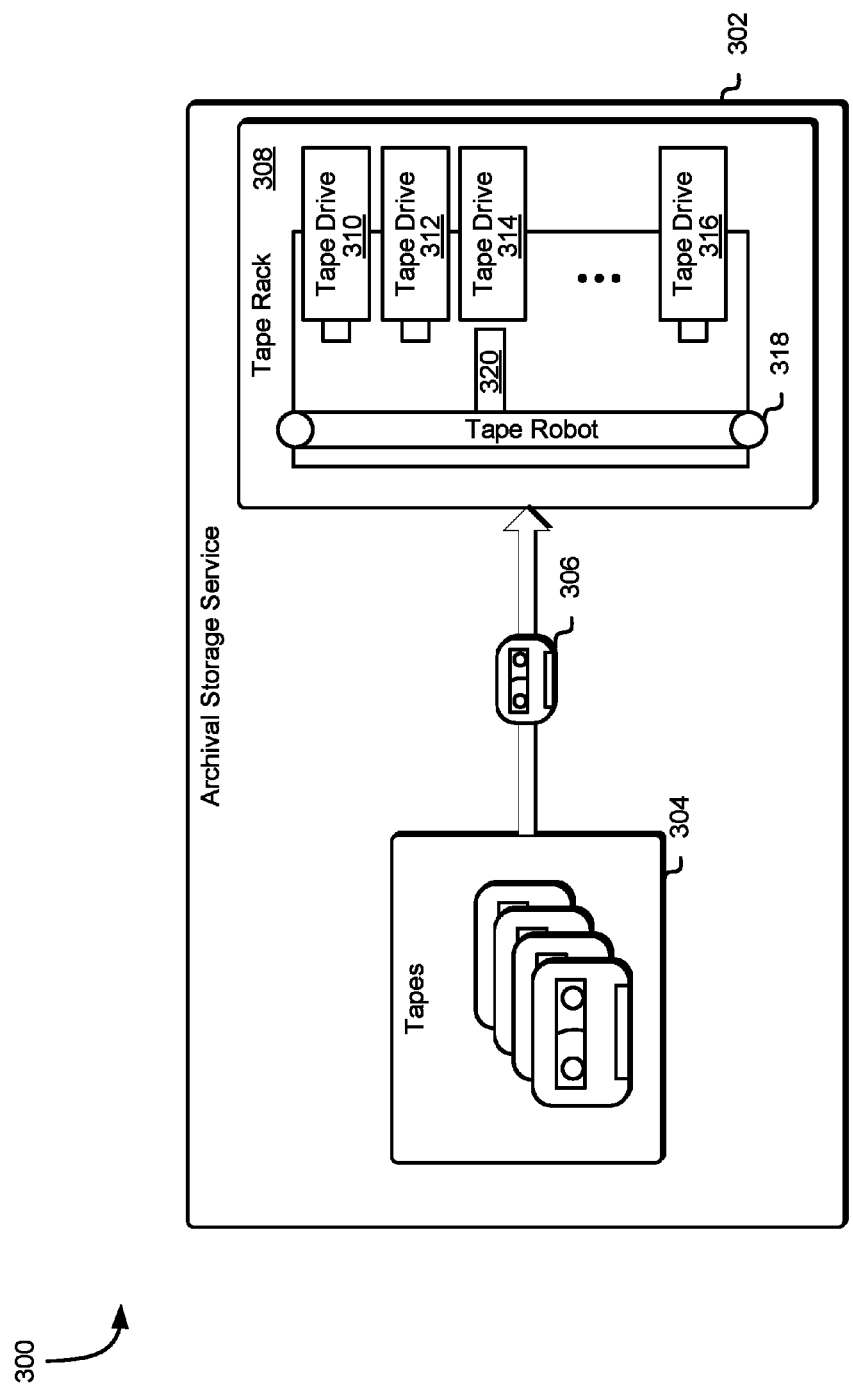
FIG. 3 illustrates an example environment detailing an archival storage service for storing backups incrementally in archival storage.

FIG. 3 illustrates an example environment 300 detailing an archival storage service for storing backups incrementally in archival storage, as described in connection with FIG. 1, and in accordance with an embodiment. In the example environment 300 illustrated in FIG. 3, the archival storage service 302 is a tape-based storage service, but as may be contemplated, an archival storage service that is a disk-based storage service, or an archival storage service that is a volatile-memory-based storage service, or an archival storage service that uses a combination of these and/or other such storage modalities may be considered as within the scope of the present disclosure.

In the archival storage service 302 illustrated in FIG. 3, a set of tapes 304 is used to store archival data. Each tape of the set of tapes 304 may store data objects such as, for example, a set of backup data, part of a set of backup data, redundancy data for sets of backup data or partial sets of backup data, or metadata for sets of backup data. Each tape of the set of tapes 304 may include a plurality of such data objects based on the size of the data objects and the capacity of the tape. When a tape is needed to store data or retrieve data, the tape is provided 306 to a tape rack 308 so that it may be mounted in a tape drive for reading and/or writing. In the example illustrated in FIG. 3, a tape rack 308 holds a plurality of tape drives (e.g., tape drive 310, tape drive 312, tape drive 314, and tape drive 316). The tape rack 308 may be one of a plurality of tape racks in the archival storage service 302.

When the tape is provided 306 to the tape rack 308, a tape robot 318 associated with the tape rack may mount the tape in an available tape drive. One tape robot 318 may be associated with a plurality of tape racks. In the example illustrated in FIG. 3, the tape 320 is to be mounted in the tape drive 314 that is empty (i.e., that does not have a tape mounted).

Each of the components of the archival storage service has a resource lifetime associated with the viability of that resource and a resource cost associated with using that resource. For example, a tape of the set of tapes 304 may be limited to a certain number of uses (or write/erase cycles) or a certain amount of time (e.g., weeks, months, or years) that the tape may be kept in the set of tapes 304. A tape drive such as the tape drive 310 may be limited to a certain number of hours of use reading or writing tapes. This number of hours may also be expressed as an annual failure rate or a reliability percentage. Similarly, a tape robot 318 may also be limited to a certain number of hours that the robot can be used to mount and/or unmount tapes. Maximizing the usage of those resources during the resource lifetime of the resource reduces the resource cost and thus, reduces the operating costs of the archival storage service.

Figure 4:
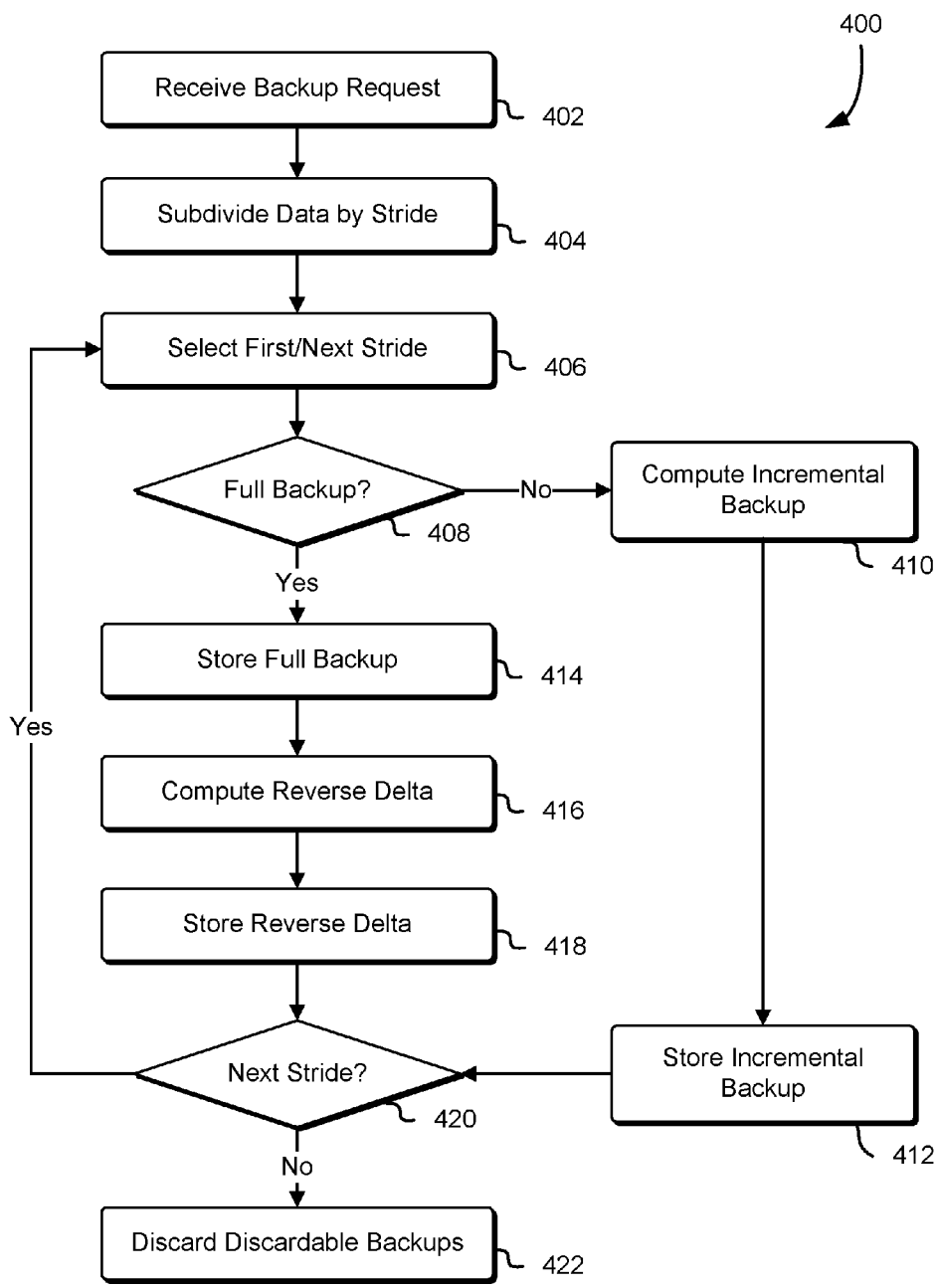
FIG. 4 illustrates an example process for processing data and generating backup data for incremental backups in archival storage.

FIG. 4 illustrates an example process 400 for processing data and generating backup data for incremental backups in archival storage, as described in connection with FIG. 1, and in accordance with an embodiment. A backup service, such as the backup service 122 described in connection with FIG. 1, may perform the example process 400 illustrated in FIG. 4. An archival storage service, such as the archival storage service 124 described in connection with FIG. 1, may also perform at least a part of the example process 400 illustrated in FIG. 4.

In the example process 400 illustrated in FIG. 4, the backup service may receive 402 a backup request that is, for example, specified as a component of a backup schedule, as described above. The backup service may then partition 404 the data that is to be backed up by stride, also as described above. For example, if the data is 128 megabytes ("MB") and there are four strides, then the data is partitioned into four strides, each of 32 MB. The data may be partitioned by assigning the first 32 MB to the first stride, the second 32 MB to the second stride, and so on. In an embodiment, every fourth subset of the data (e.g., every fourth sector of the data) is assigned to a stride so that the first stride includes sectors one, five, nine, etc., the second stride includes sectors two, six, ten, etc., and so on. Such a partition allows data added to the end of a set of data (e.g., if the data increases from 128 MB to 256 MB) to be at the end of each stride. In the event that the data cannot be evenly partitioned, the data in each stride may be padded with null values (or "zeroes") to make the strides equally sized.

The backup service may next select 406 the first stride and, for that stride, determine 408 whether a full backup of that stride should be made. As described above, for each stride, a full backup is generated once for each period of the backup (e.g., for four weeks of backup, a full backup of each stride is generated once every four weeks). The full backups for each stride are also distributed so that, for each week, only one of the strides has a full backup.

If the backup service does determine 408 that a full backup of the stride should be made, the backup service may then store 414 the full backup, computes 416 the reverse delta for the full backup, and store 418 the reverse delta. The reverse delta, described above, includes the changes to the last full backup as compared to the data (i.e., the changes that would need to be made to the current data to reproduce the last full backup) and is computed by comparing that last full backup to the data. The last full backup may be retrieved by the backup service from an archival storage service, such as the archival storage service 124 described at least in connection with FIG. 1. The backup service may also store 414 the full backup and store 418 the reverse delta using the archival storage service.

If the backup service does not determine 408 that a full backup of the stride should be made, the backup service may instead compute 410 a partial incremental backup (or delta) for the stride. The partial incremental backup, also described above, includes the changes made to the data since the last full backup (i.e., the changes that would need to be made to the last full backup to reproduce the data) and is computed by comparing the data to the last full backup. As with the reverse delta computation, the last full backup may be retrieved by the backup service from the archival storage service. The backup service may then store 412 the incremental backup using the archival storage service.

After storing the backups and deltas, the backup service may determine 420 whether there are more strides to process. If the backup service does determine 420 that there are more strides to process, the backup service may select 406 the next stride and repeat the process for that stride. If the backup service does not determine 420 that there are more strides to process, the backup service may discard 422 any discardable backups and deltas, as described above and in connection with FIG. 12.

Figure 5:
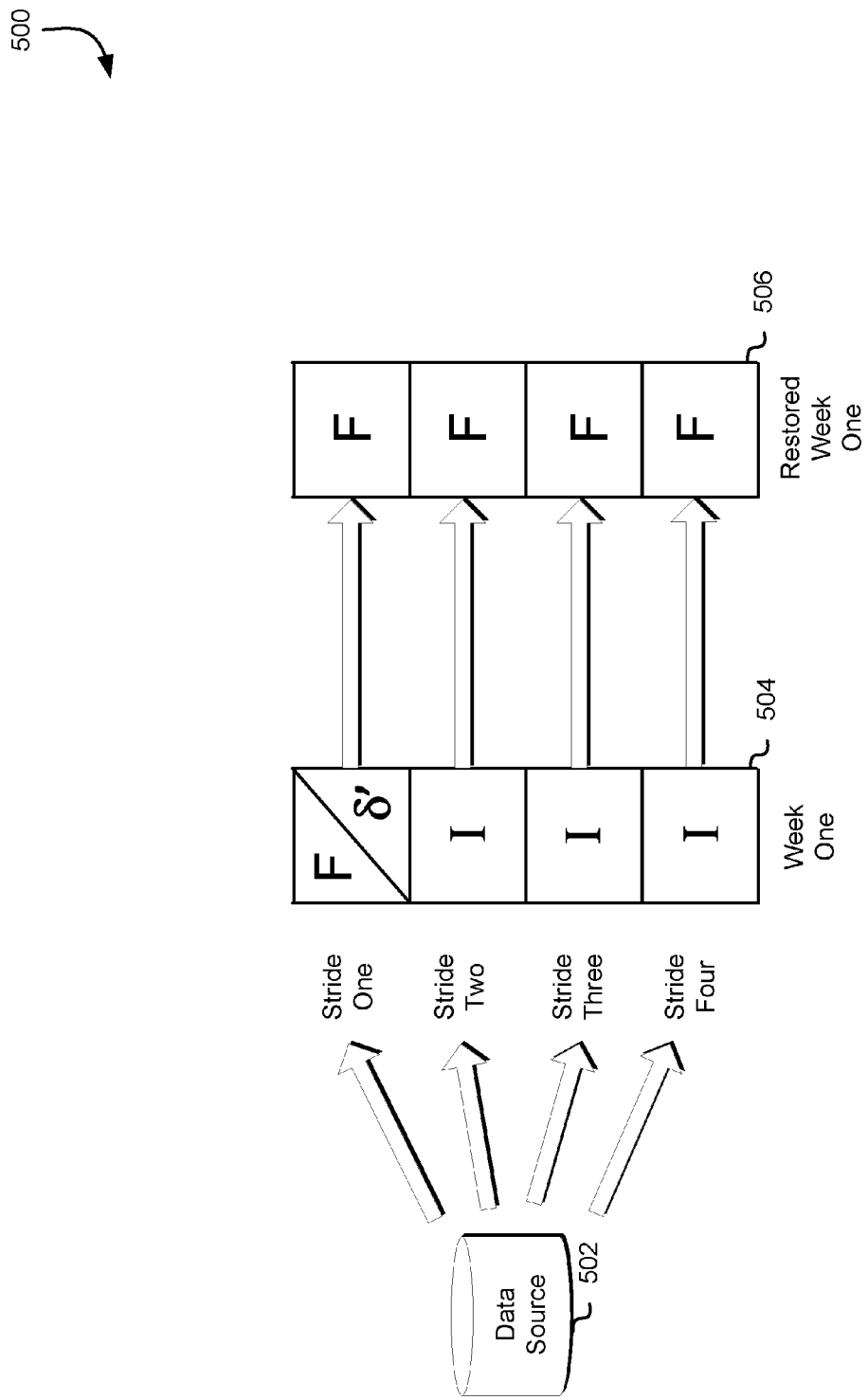
FIG. 5 illustrates an example diagram where data is processed and backup data is generated for incremental backups stored in archival storage.

FIG. 5 illustrates an example diagram 500 where data is processed and backup data is generated for incremental backups stored in archival storage, as described in connection with FIG. 1, and in accordance with an embodiment. In the example diagram 500 illustrated in FIG. 5, data from a data source 502 is divided into four strides based on a backup schedule such as that described above that specifies that a data source should be fully backed up every three months (i.e., quarterly) and that those quarterly backups should be retained indefinitely, that specifies that the data source should be fully backed up weekly and that those weekly backups should be retained for four weeks, and that specifies that the data source should be incrementally backed up daily and that those daily backups should be retained for a week.

The example illustrated in FIG. 5 illustrates the first week of an incremental backup schedule so, for week one 504, stride one has a full backup (denoted by an "F") and a reverse delta (denoted by a "δ'") and stride two, stride three, and stride four have a partial incremental backup (denoted by an "I"). It should be noted that the reverse delta "δ'" of stride one is the reverse of the full backup "F" of stride two because there is no previous full backup. That is, the reverse delta "δ'" of week one 504 is the reverse delta between the full backup "F" and a null set. In an embodiment where the reverse delta "δ'" is a bidirectional-delta, the reverse delta "δ'" of week one is identical to the full backup "F" when it is computed using, for example, an XOR operation. It should be noted that an XOR operation is merely an illustrative example of an operation that may be used to produce a bidirectional delta. Additionally, each of the incremental backups "I" is also identical to a full backup for that stride since they are also computed by comparing the stride data to the null set (i.e., because there is no previous full backup for those strides). Thus, the full backups for the four strides for the restored week one 506 can be restored from the full and incremental backups of week one 504. These restored backups can then be used to reproduce the original data set (i.e., the set of data that was backed up).

Figure 6:
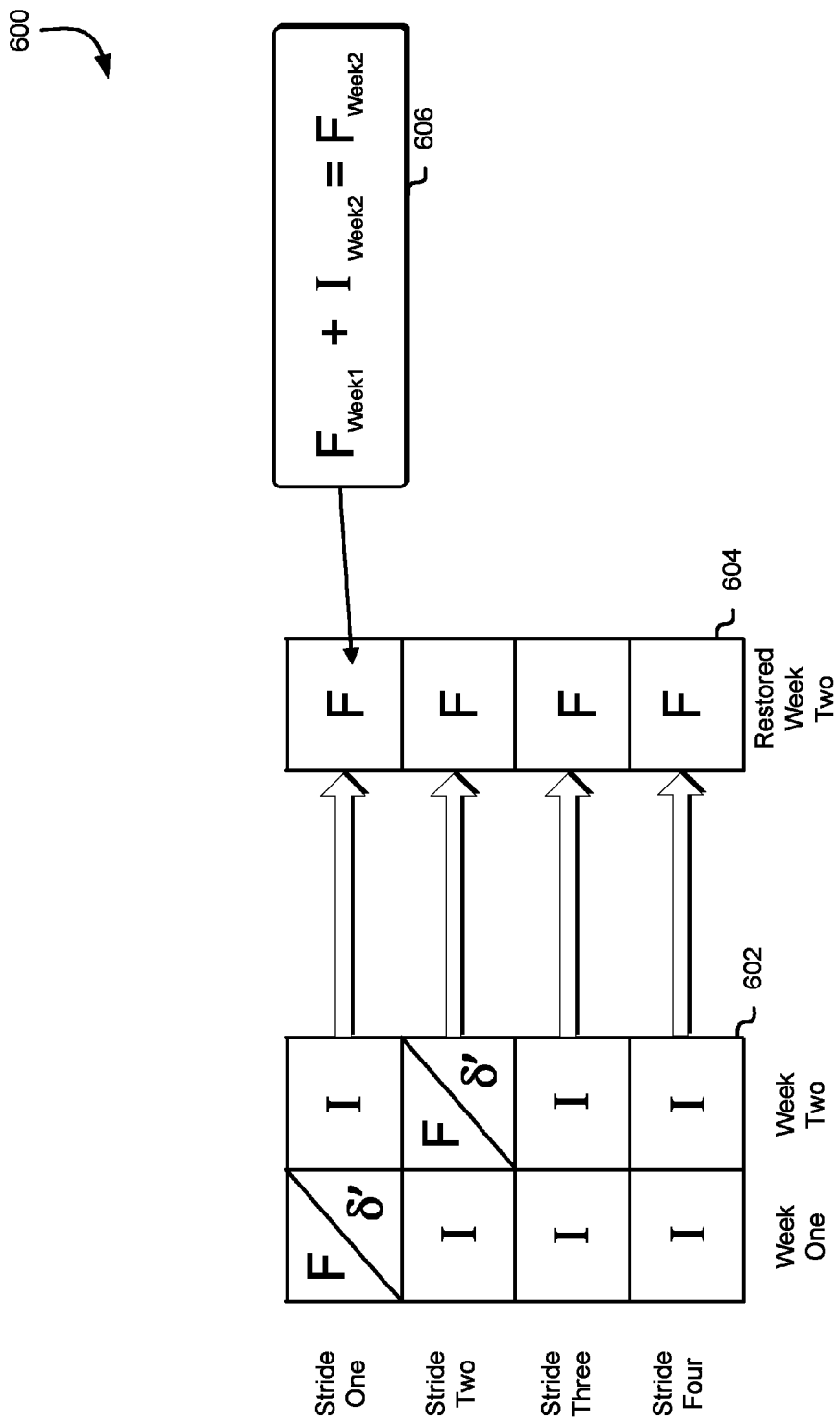
FIG. 6 illustrates an example diagram where data is processed, backup data is generated, and backup data is restored from incremental backups stored in archival storage.

FIG. 6 illustrates an example diagram 600 where data is processed, backup data is generated, and backup data is restored from incremental backups stored in archival storage, as described in connection with FIG. 1, and in accordance with an embodiment. In the example diagram 600 illustrated in FIG. 6, weeks one and two 602 of the incremental backup are shown with the backups for week one, as illustrated in FIG. 5, and an incremental backup "I" for stride one of week two, a full backup "F" and a reverse delta "δ'" for stride two of week two, an incremental backup "I" for stride three of week two, and an incremental backup "I" for stride four of week two.

In week two (just as with week one), the reverse delta "δ'" of stride two is the reverse of the full backup "F" of stride two because there is no previous full backup of stride two. Additionally, each of the incremental backups "I" for stride three and stride four are also identical to a full backup for that stride since they are also computed by comparing the stride data to the null set (i.e., because there is no previous full backup for those strides). However, the partial incremental backup of stride one for week two is a partial incremental backup because it is generated from the full backup of stride one for week one. Because, as shown in formula 606, the full backup of week one for stride one (denoted "$F_{Week1}$"), combined with the incremental backup of week two (denoted "$I_{Week2}$"), produces the full backup of week two for stride one (denoted "$F_{Week2}$"), the full backups for the four strides for the restored week two 604 can be restored from the full and incremental backups of weeks one and two 602. These restored backups can then be used to reproduce the original data set (i.e., the set of data that was backed up).

Figure 7:
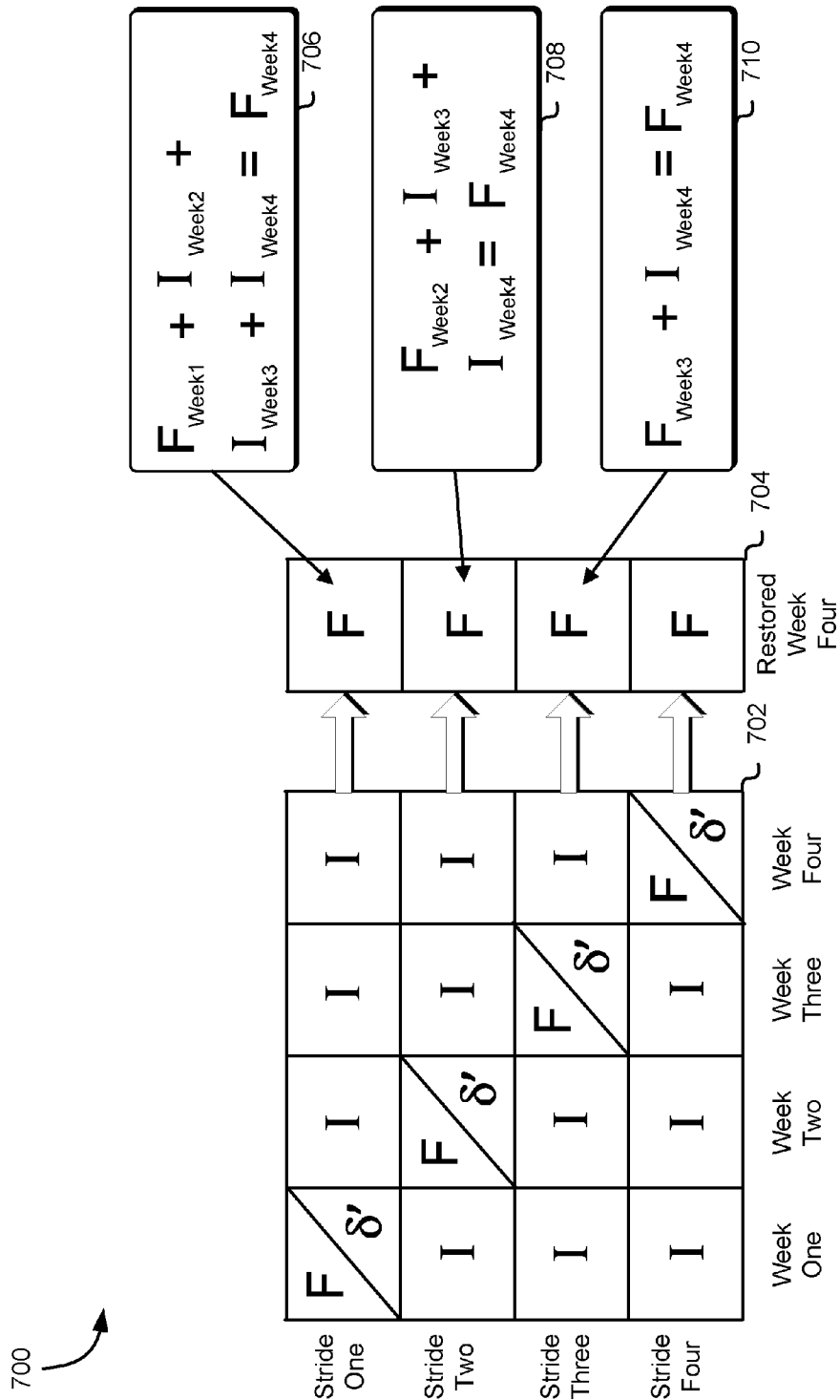
FIG. 7 illustrates an example diagram where additional data is processed, backup data is generated, and backup data is restored from incremental backups stored in archival storage.

FIG. 7 illustrates an example diagram 700 where additional data is processed, backup data is generated, and backup data is restored from incremental backups stored in archival storage, as described in connection with FIG. 1, and in accordance with an embodiment. In the example diagram 700 illustrated in FIG. 7, weeks one, two, three, and four 702 of the incremental backup are shown with the backups for week one and two, as illustrated in FIG. 6, and additional backups for weeks three and four added. The full backups for restored week four 704 are produced by the formulas shown. The first formula 706 shows that the full backup for stride one in week four is produced from $F_{Week1}$, $I_{Week2}$, $I_{Week3}$, and $I_{Week4}$ of stride one. The second formula 708 shows that the full backup for stride two in week four is produced from $F_{Week2}$, $I_{Week3}$, and $I_{Week4}$ of stride two. The third formula 710 shows that the full backup for stride three in week four is produced from $F_{Week3}$ and $I_{Week4}$ of stride three. The full backup for stride four in week four is directly stored.

Figure 8:
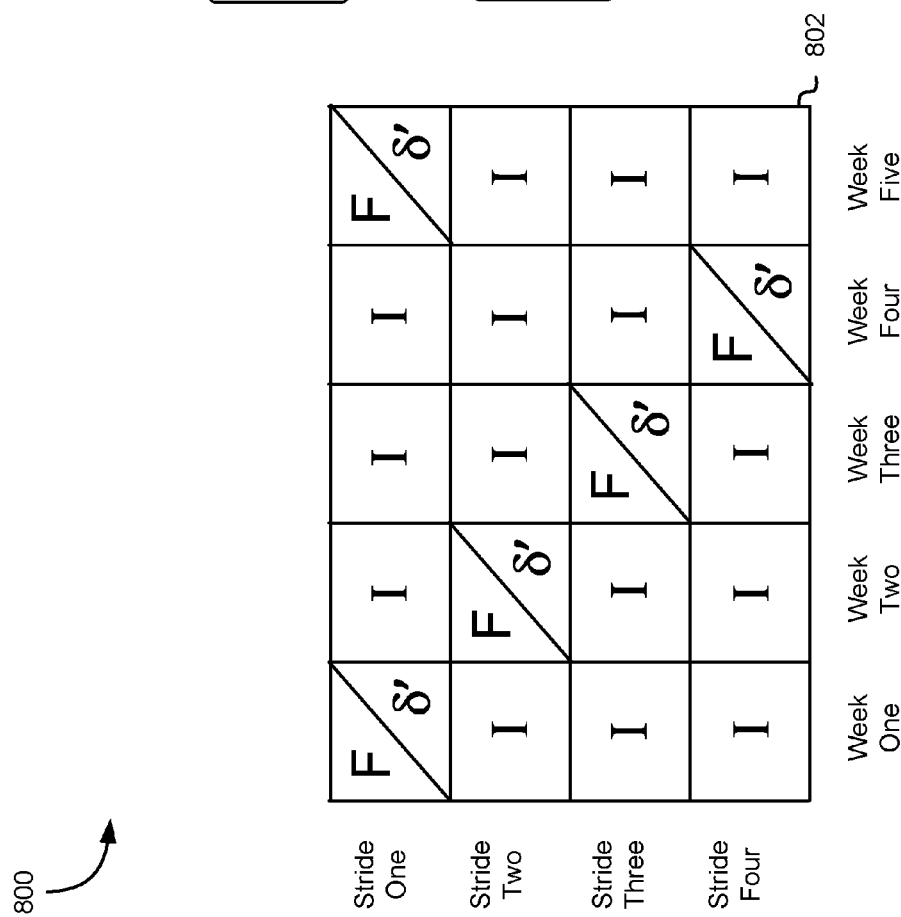
FIG. 8 illustrates an example diagram where full backups are restored from reverse delta backups stored in archival storage.

FIG. 8 illustrates an example diagram 800 where full backups are restored from reverse delta backups stored in archival storage, as described in connection with FIG. 1, and in accordance with an embodiment. In the example diagram 800 illustrated in FIG. 8, weeks one through five 802 of the incremental backup are shown with the backups for weeks one through four, as illustrated in FIG. 7, and the additional backup for week five added. Week five is the first repeat of the backup cycle a new full backup for stride one and incremental backups for strides two, three, and four. The formula 804 shows that the reverse delta $\delta'_{Week5}$ is used to regenerate the full backup $F_{Week1}$ from the full backup $F_{Week5}$. It should be noted that, if the reverse delta $\delta'_{Week5}$ is a bidirectional delta (as described above), the full backup $F_{Week5}$ can also be produced from the full backup $F_{Week1}$ using the reverse delta $\delta'_{Week5}$, as illustrated in the formula 806.

Figure 9:
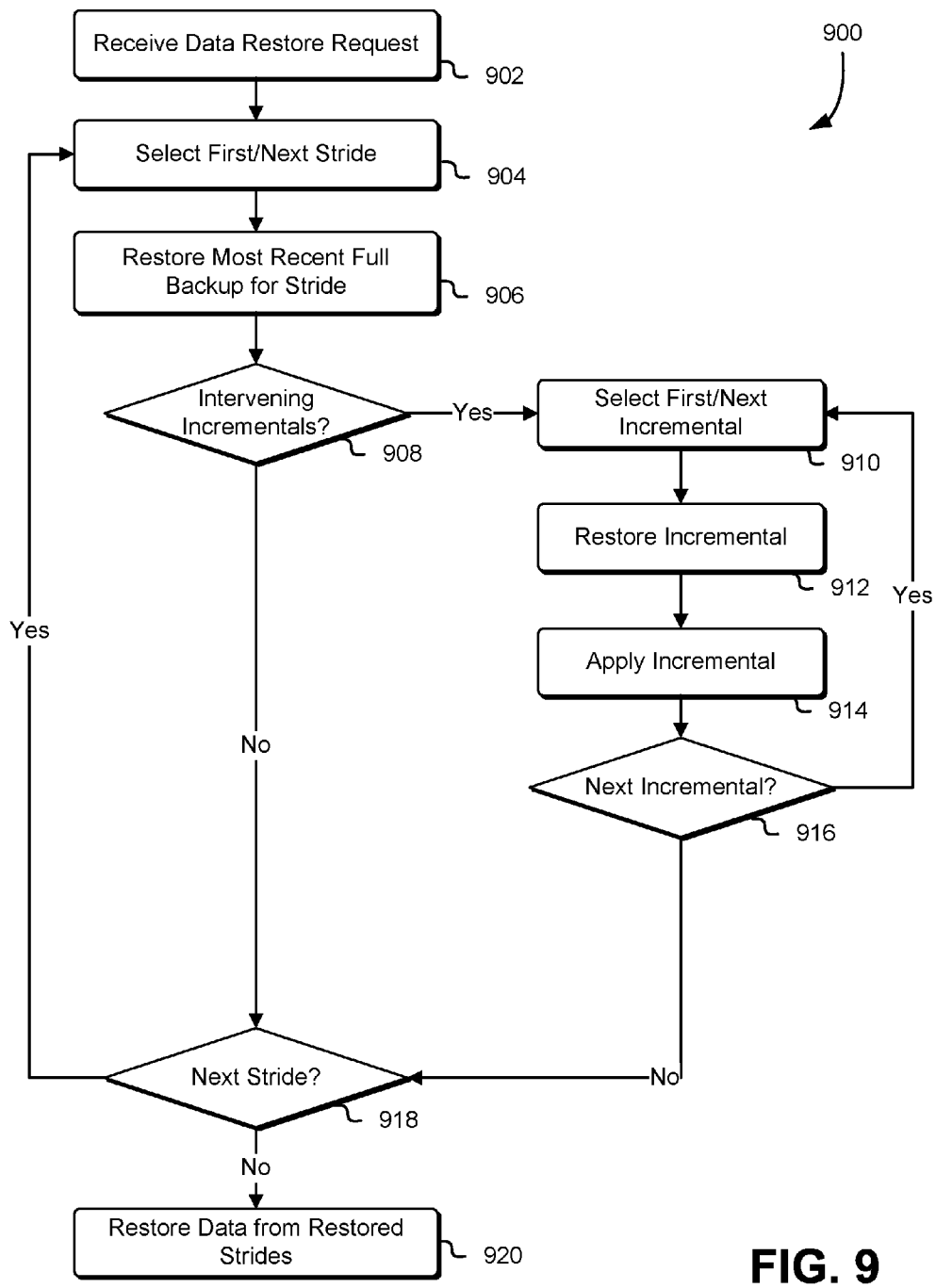
FIG. 9 illustrates an example process for restoring backup data from incremental backups in archival storage.

FIG. 9 illustrates an example process 900 for restoring backup data from incremental backups in archival storage, as described in connection with FIG. 1, and in accordance with an embodiment. A backup service, such as the backup service 122 described in connection with FIG. 1, may perform the example process 900 illustrated in FIG. 9. An archival storage service, such as the archival storage service 124 described in connection with FIG. 1, may also perform at least a part of the example process 900 illustrated in FIG. 9.

In the example process 900 illustrated in FIG. 9, the backup service may first receive 902 a restore request. A restore request is a request to restore data from previous backups. For example, a backup schedule that specifies that a data source should be fully backed up every three months (i.e., quarterly) and that those quarterly backups should be retained indefinitely, that specifies that the data source should be fully backed up weekly and that those weekly backups should be retained for four weeks, and that specifies that the data source should be incrementally backed up daily and that those daily backups should be retained for a week means that a restore request can be received for any previous quarterly backup, for any weekly backup for the previous four weeks, or for any daily backup for the previous week.

For a given restore request, the backup service may first select 904 the first stride of the data and may restore 906 the most recent full backup for that stride from the archival storage service as described above. The backup service may next determine 908 whether there are any intervening incrementals between the most recent full backup for the stride and the desired restore point. For example, using the example illustrated in FIG. 8, to restore stride one from week four data, the most recent full backup is from week one and weeks two, three, and four have intervening incrementals (i.e., incremental backups between the desired restore week and the last full backup). Conversely, to stride two from week four data, the most recent full backup is from week two and weeks three and four have intervening incrementals.

If the backup service does determine 908 that there are intervening incrementals, the backup service may select 910 the first intervening incremental (i.e., the oldest intervening incremental), may restore 912 that intervening incremental, and may apply 914 that intervening incremental to update the data. The backup service may then determine 916 if there are additional intervening incrementals and, if so, may continue selecting and applying intervening incrementals. Conversely, if the backup service does determine 908 that there are no intervening incrementals, then the most recent full backup for the stride contains the most recent data.

The backup service will continue restoring strides until it determined 918 that all strides have been restored. The backup service may then restore 920 the data from the restored stride data by, for example, recombining the stride data. For example, if the strides were generated by putting every $n^{th}$ sector of data in a corresponding stride (i.e., sectors one, five, nine, etc. in stride one, sectors two, six, ten, etc. in stride two, sectors three, seven, eleven, etc. in stride three, and sectors four, eight, twelve, etc. in stride four), the backup service may then restore 920 the data by reversing this process and selecting the first sector from stride one, the first sector from stride two, the first sector from stride three, the first sector from stride four, the second sector from stride one, and so on.

Figure 10:
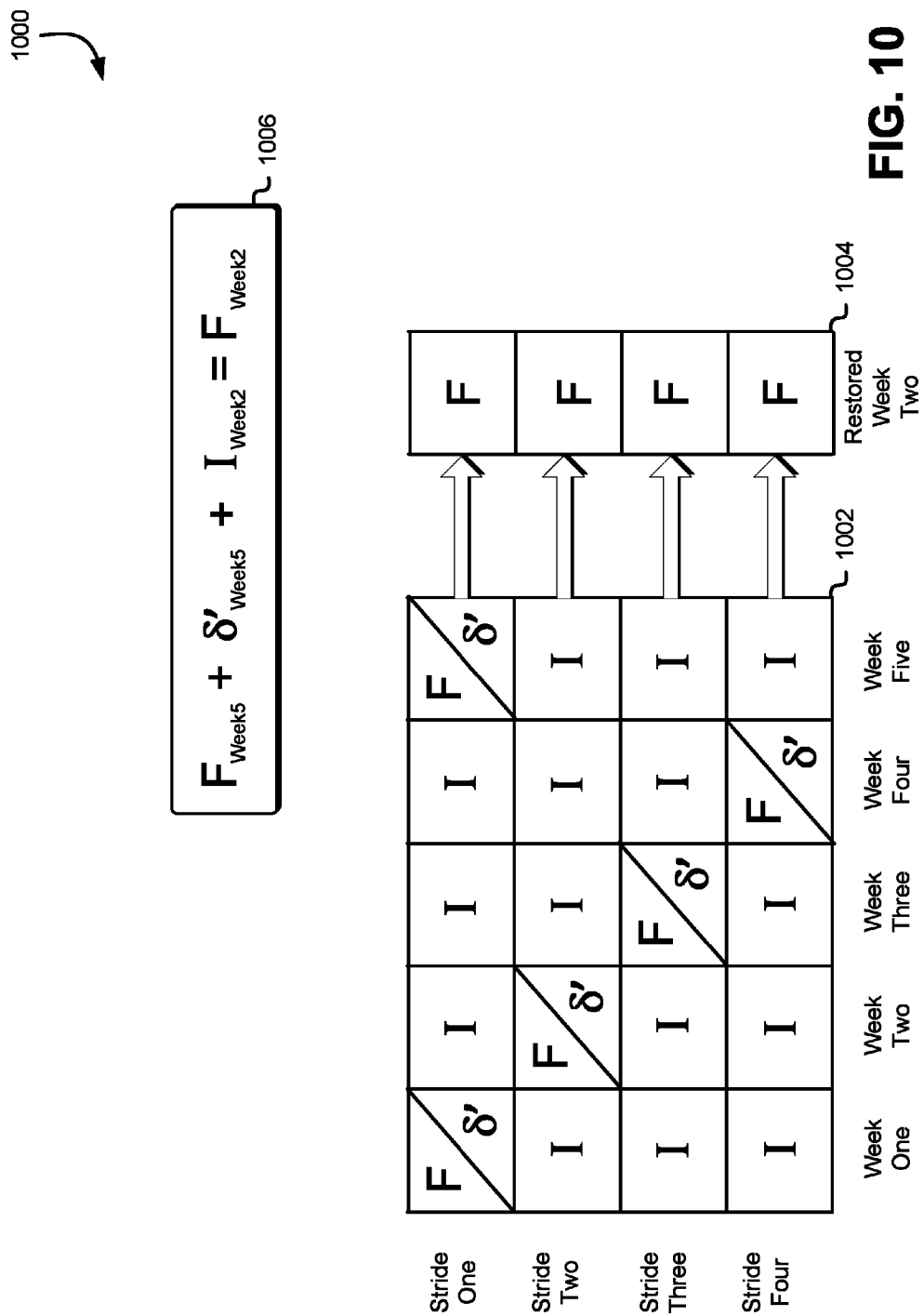
FIG. 10 illustrates an example diagram where data is restored from incremental and full backups stored in archival storage.

FIG. 10 illustrates an example diagram 1000 where data is restored from incremental and full backups stored in archival storage, as described in connection with FIG. 1, and in accordance with an embodiment. The restored week two data 1004 for the four strides can thus be produced. In the example diagram 1000 illustrated in FIG. 10, weeks one through five 1002 of the incremental backup are shown with the backups for weeks one through five, as illustrated in FIG. 8. In the example illustrated in FIG. 10, the data for strides two, three, and four are restored using the techniques described in connection with FIG. 6. However, the data for stride one is restored, as described in connection with FIG. 8 and illustrated in formula 804, to produce the full backup for week one. In the example illustrated in FIG. 10, the full backup of week one, as restored, is combined with the incremental backup $I_{Week2}$ to restore the full backup $F_{Week2}$. The restored week two data 1004 for the four strides can thus be produced. Combining full backup $F_{Week5}$ with reverse delta $\delta'_{Week5}$ and incremental backup $I_{Week2}$ to produce full backup $F_{Week2}$ is shown in formula 1006.

FIG. 11 illustrates an example diagram 1100 where additional data is processed and backup data is generated for incremental backups stored in archival storage, as described in connection with FIG. 1, and in accordance with an embodiment. In the example diagram 1100 illustrated in FIG. 11, full and incremental backups for weeks one through nine 1102 are shown.

Figure 12:
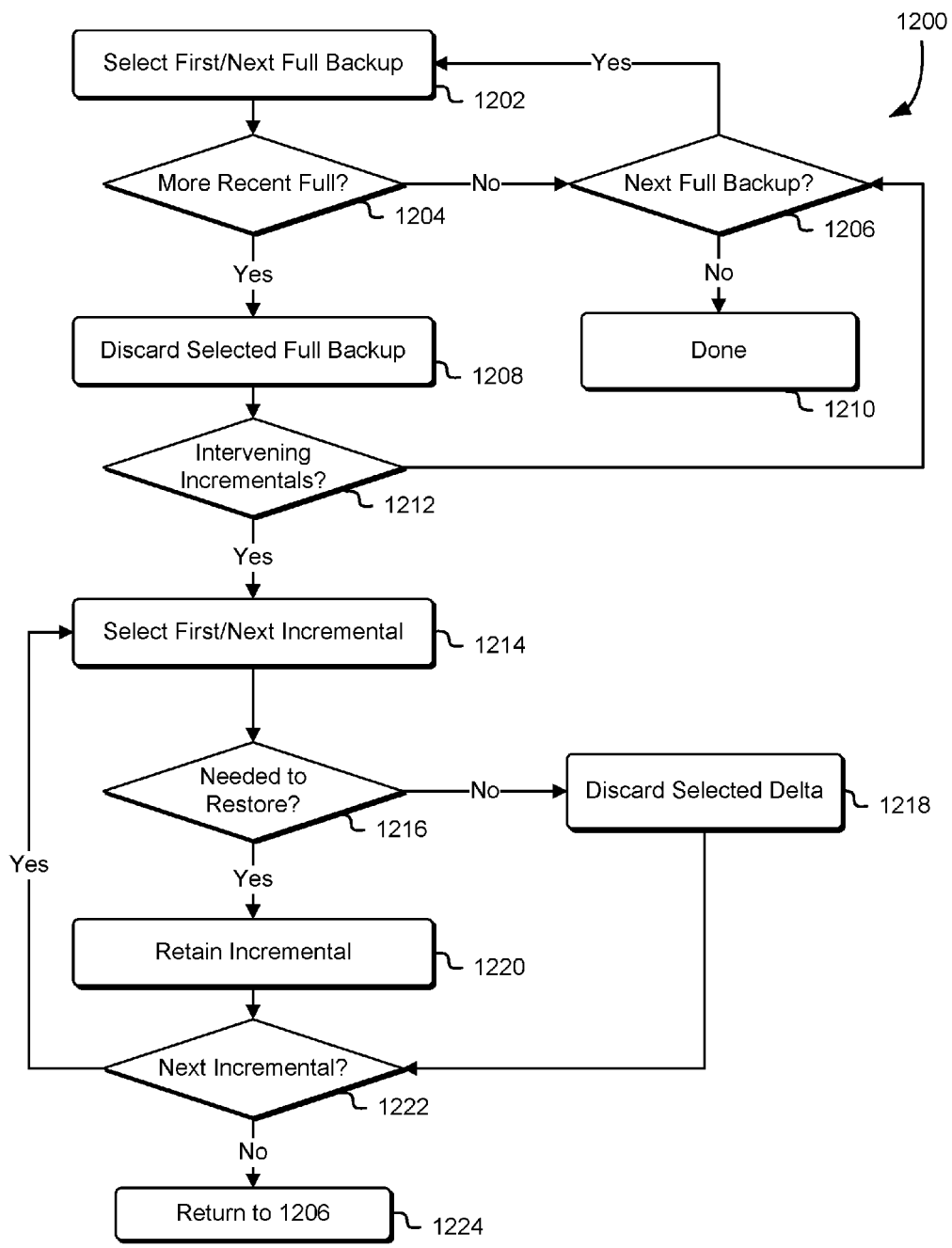
FIG. 12 illustrates an example process for discarding unneeded incremental backups from archival storage.

FIG. 12 illustrates an example process 1200 for discarding unneeded incremental backups from archival storage, as described in connection with FIG. 1, and in accordance with an embodiment. A backup service, such as the backup service 122 described in connection with FIG. 1, may perform the example process 1200 illustrated in FIG. 12. An archival storage service, such as the archival storage service 124 described in connection with FIG. 1, may also perform at least a part of the example process 1200 illustrated in FIG. 12. It should be noted that the example process illustrated in FIG. 12 may be performed while storing backup data in the archival storage service, while restoring backup data from the archival storage service, or as a separate process that may be executed periodically by the backup service.

The example process illustrated in FIG. 12 is illustrated for a single stride but, as may be contemplated, the process may be repeated for multiple strides. In the example process 1200 illustrated in FIG. 12, the backup service starts by selecting 1202 the first full backup for a stride of a set of backup data. The backup service may next determine 1204 whether there is a more recent full backup for the stride. The backup service may determine 1204 if there is a more recent full backup for the stride by using the archival storage service to read data or by using metadata about the backup associated with the stride (i.e., but comparing the date of the selected full backup to metadata specifying the date of the most recent full backup).

If the backup service does determine 1204 that there are not any more recent full backups, the backup service may search to determine 1206 whether there are any additional full backups for the stride, if any are found, may select 1202 those more recent full backups for processing. When the backup service does determine 1206 that there are no more additional full backups for the stride, the example process 1200 illustrated in FIG. 12 is done 1210.

If the backup service does determine 1204 that there are full backups that are more recent than the selected backup, the backup service may discard 1208 the selected full backup because a more recent full backup obviates the use of the selected full backup for restore operations. The backup service may then determine 1212 whether there are intervening incrementals between the selected full backup and the next full backup. If there are not, the backup service may then determine 1206 whether there are any more full backups for processing, as described above.

If the backup service does determine 1212 that there are intervening incrementals between the selected full backup and the next full backup, the backup service may select 1214 the first intervening incremental and determine 1216 whether that selected intervening incremental is needed to restore data based on, for example, the backup schedule and the most recent full backup. If the backup service does determine 1216 that the selected intervening incremental is not needed to restore data, the backup service may 1218 discard the selected intervening incremental. Conversely if the backup service does determine 1216 that the selected intervening incremental is needed to restore data, the backup service may 1220 retain the selected intervening incremental. The backup service may then continue selecting and processing intervening incrementals until it is determined 1222 that there are no more intervening incrementals. Finally, the backup service will restart 1224 the process and determine 1206 whether there are any more full backups for processing as described above.

Figure 13:
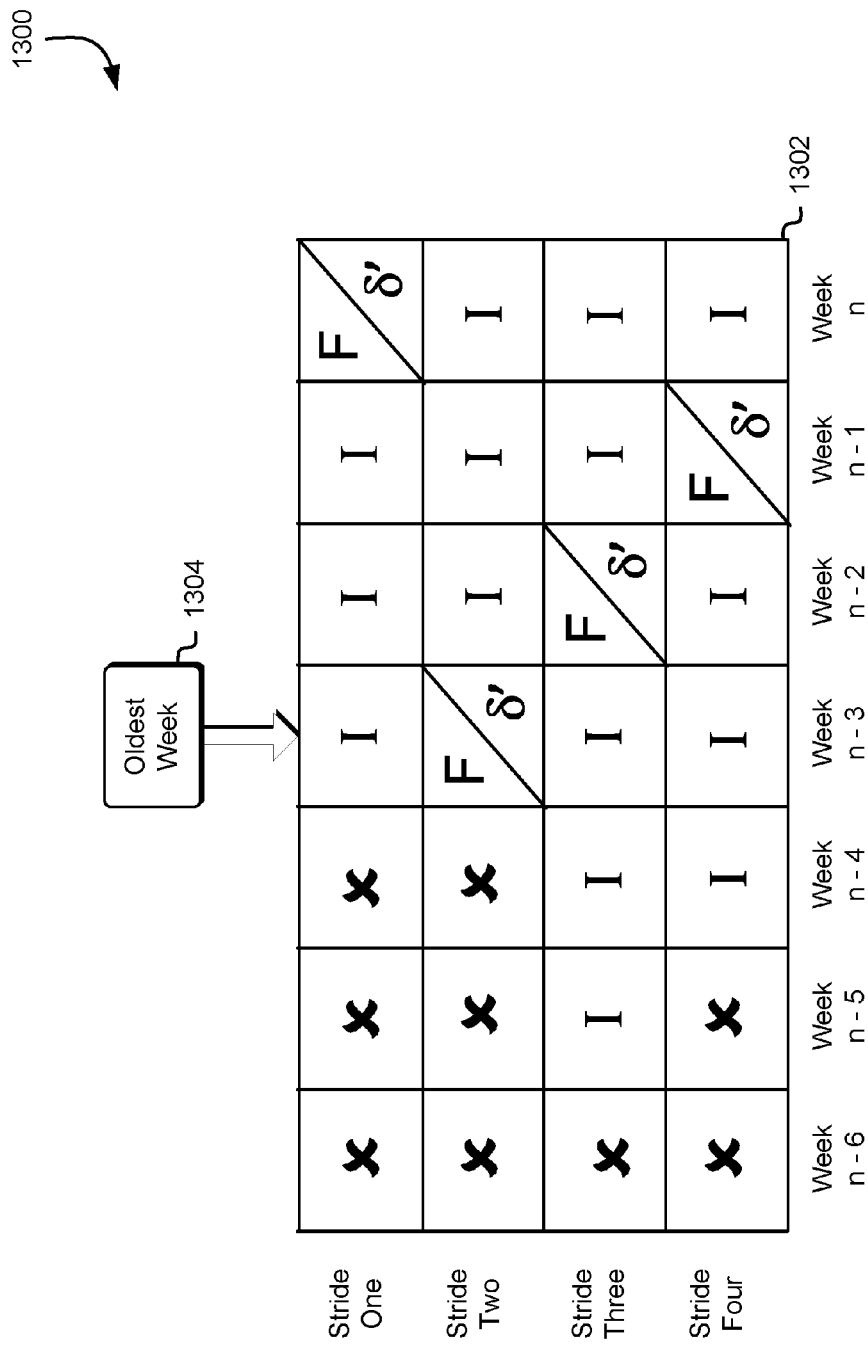
FIG. 13 illustrates an example diagram where unneeded incremental backup data is removed from archival storage.

FIG. 13 illustrates an example diagram 1300 where unneeded incremental backup data is removed from archival storage, as described in connection with FIG. 1, and in accordance with an embodiment. In the example diagram 1300 illustrated in FIG. 13, full and incremental backups, and reverse deltas for a six week period 1302 are shown. The full and incremental backups, as well as the reverse deltas are generated as described above. In the example illustrated, week "n" is the most recent week and week "n−3" is the oldest week 1304.

The example illustrated in FIG. 13 shows that the backups and reverse deltas can be used to restore data for any of weeks "n−3," "n−2," "n−1," or "n." The example illustrated in FIG. 13 also shows previous backups and reverse deltas that have been removed as being no longer necessary for restoration of data, as described in connection with FIG. 12. The removed previous backups and reverse deltas are denoted with an "x" in FIG. 13. For example, the previous full backup of stride one for week "n−4" has been removed because the full backup for stride one, week "n" has been generated and thus, as was described in connection with FIG. 12, the previous full backup is not needed anymore because it can be regenerated from the full backup and the reverse delta at week "n." Similarly, the incremental backups for stride two for weeks "n−6," "n−5," and "n−4" may also no longer be needed to restore data in stride two for any week after week "n−4." Conversely, the incremental backups for stride three for weeks "n−5" and "n−4" have not been removed because they are needed to restore the full backup for week "n−3" (i.e., because the full backup of stride three of week "n−3" is generated from the full backup of week "n−2," the reverse delta of week "n−2," the incremental of week "n−5," the incremental of week "n−4," and the incremental of week "n−3."

Although not illustrated in FIG. 13, in an embodiment, reverse deltas can be generated for each of the incremental backups so that, for example, the incremental of stride one for week "n−2" can be combined with a corresponding reverse delta for that incremental to produce the incremental of stride one for week "n−3." In such an embodiment, a reverse delta from a full backup to the previous incremental (e.g., from the full backup of week "n−2" for stride three to the incremental of week "n−3" of stride three) can also be generated. With such additional reverse deltas, additional incremental backups can be removed such as, for example, the incrementals for weeks "n−5" and "n−4" for stride three.

In such an embodiment, data for a stride may be restored using a shortest path approach. For example, the incremental for week "n−1" may be directly restored using the full backup of week "n" and such a reverse delta to week "n−1" rather than requiring the full backup of week "n," the reverse delta of week "n," the incremental of week "n−3," the incremental of week "n−2," and the incremental of week "n−1."

Figure 14:
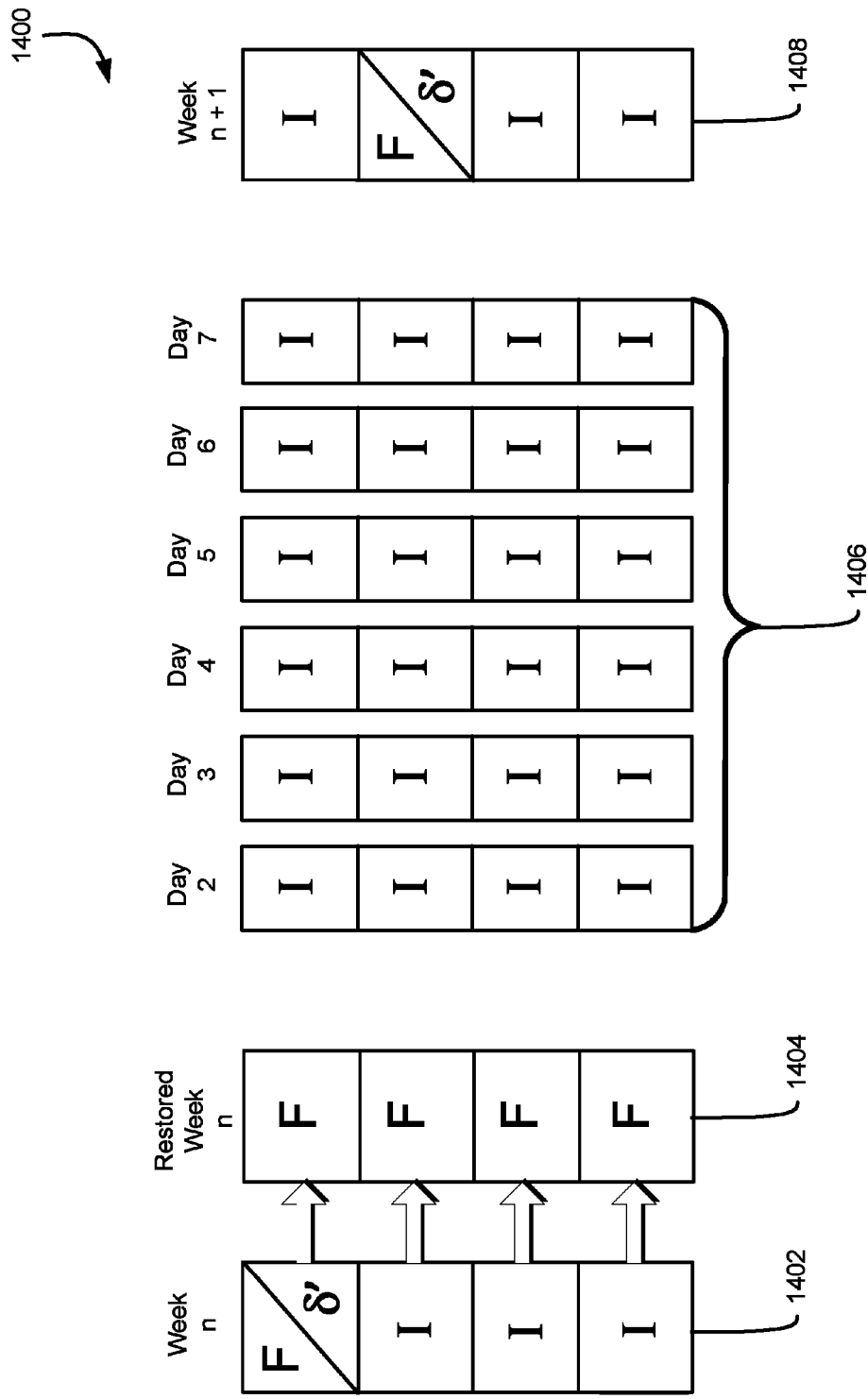
FIG. 14 illustrates an example diagram where daily data is processed and backup data is generated for incremental backups stored in archival storage.

FIG. 14 illustrates an example diagram 1400 where daily data is processed and backup data is generated for incremental backups stored in archival storage, as described in connection with FIG. 1, and in accordance with an embodiment. In the example diagram 1400 illustrated in FIG. 14, the stride labels have been eliminated for clarity. In the example illustrated in FIG. 14, the backup data for week "n" 1402 is as described for week "n" in FIG. 13. As previously discussed, the backup data for week "n" 1402 can be used to generate restored data for week "n" 1404. Such restored data for week "n" 1404 can then be considered a full backup for the data. This full backup can be used as the basis for daily backups in a backup schedule that specifies that a data source should be fully backed up every three months (i.e., quarterly) and that those quarterly backups should be retained indefinitely, that specifies that the data source should be fully backed up weekly and that those weekly backups should be retained for four weeks, and that specifies that the data source should be incrementally backed up daily and that those daily backups should be retained for a week, as described above. The daily backups 1406 are incremental backups for each stride which include the changes made to that stride since the previous day. In an embodiment, these daily backups may be used to, for example, generate the incremental and full backups for week "n+1" 1408. Note that the restored data for week "n" 1404 is the "Day 1" backup for the daily backups 1406.

Figure 15:
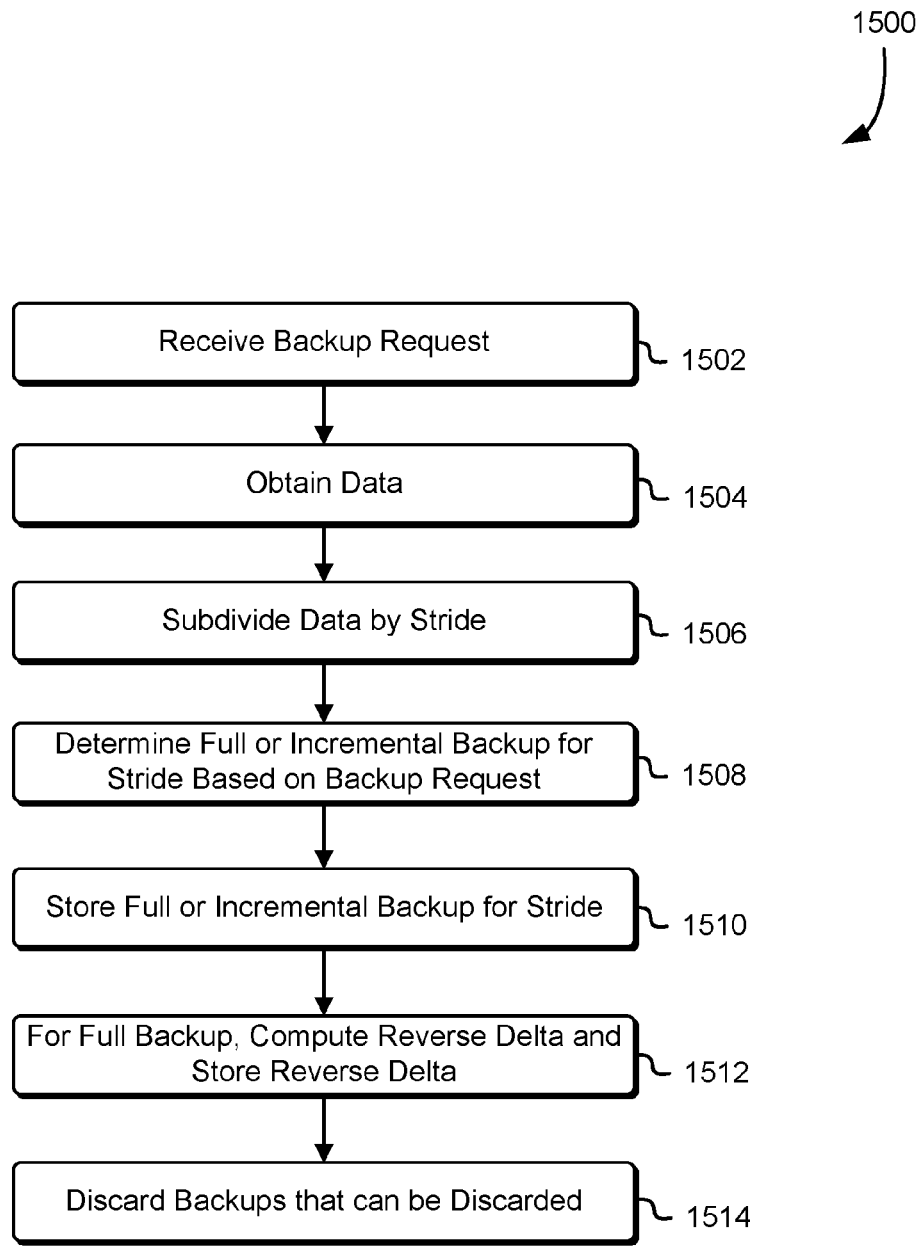
FIG. 15 illustrates an example process for storing incremental backups in archival storage.

FIG. 15 illustrates an example process 1500 for storing incremental backups in archival storage, as described in connection with FIG. 1, and in accordance with an embodiment. A backup service, such as the backup service 122 described in connection with FIG. 1, may perform the example process 1500 illustrated in FIG. 15. An archival storage service, such as the archival storage service 124 described in connection with FIG. 1, may also perform at least a part of the example process 1500 illustrated in FIG. 15. In the example process 1500 illustrated in FIG. 15, the backup service will first receive 1502 a backup request. Based at least in part on the backup request, the backup service will then obtain 1504 the data that will be backed up. The backup service will next partition 1506 the data by strides, as described above, and, for each stride, will determine 1508 whether the stride data should have a full or an incremental backup based at least in part on the backup request. For each stride, the backup service will then store 1510 the full or incremental backup for that stride. If the backup is a full backup, the backup service will compute 1512 and store a reverse delta for that full backup (i.e., store a reverse delta back to the previous full backup). In an embodiment, the backup service will then discard 1514 backups that can be discarded, as described above. In another embodiment, the reverse delta is compressed prior to being stored. In an example, a reverse delta that is a reverse delta back to a previous full backup where there are only a small number of changes is mostly zero (i.e., an indication of no change). A set of data that is mostly zeroes can be efficiently compressed using, for example, run-length encoding, to a very small size. Data that is more volatile (i.e., that has a higher mutation rate) may have backups that are less compressible.

Figure 16:
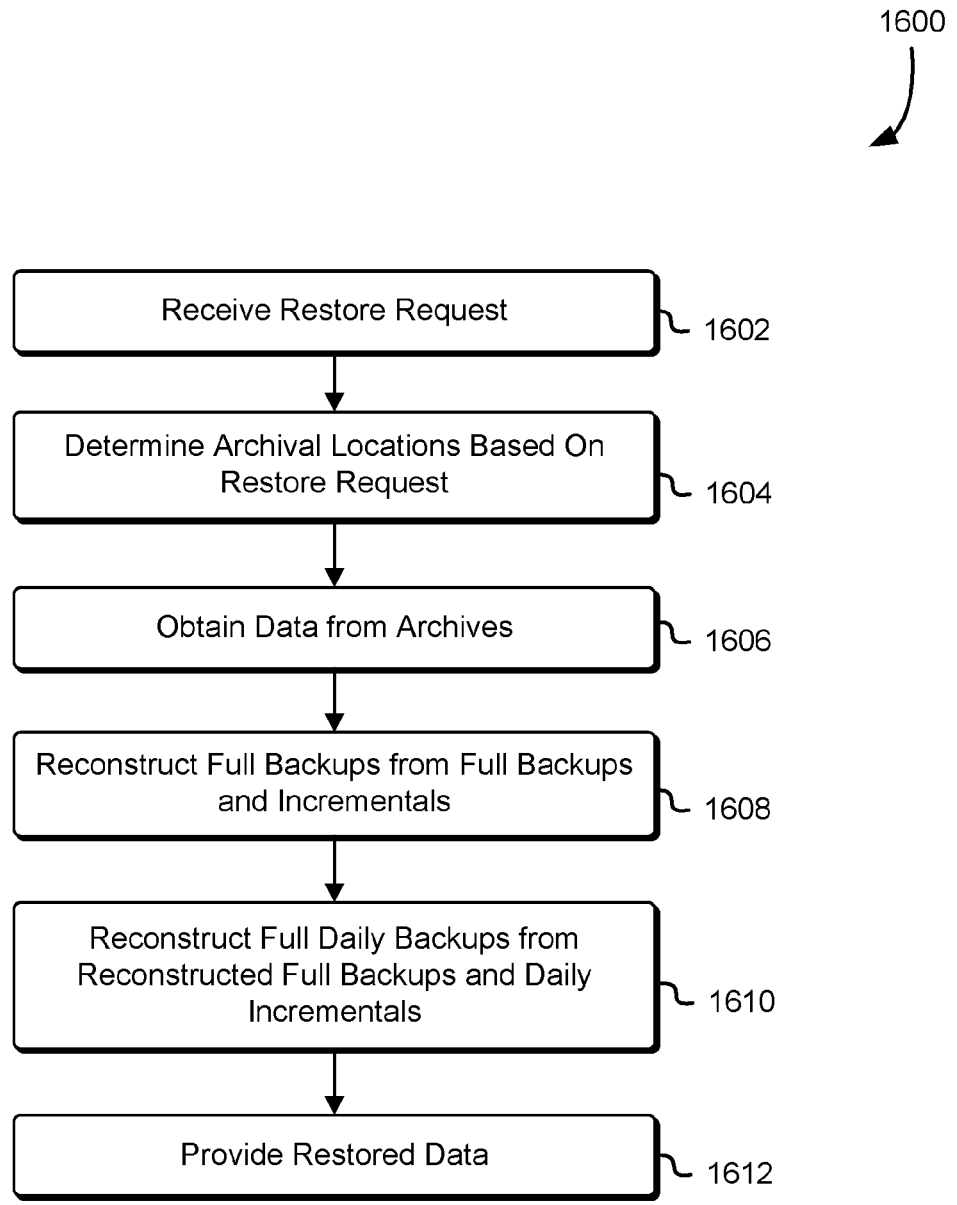
FIG. 16 illustrates an example process for restoring data from incremental backups in archival storage.

FIG. 16 illustrates an example process 1600 for restoring data from incremental backups in archival storage, as described in connection with FIG. 1, and in accordance with an embodiment. A backup service, such as the backup service 122 described in connection with FIG. 1, may perform the example process 1600 illustrated in FIG. 16. An archival storage service, such as the archival storage service 124 described in connection with FIG. 1, may also perform at least a part of the example process 1600 illustrated in FIG. 16. In the example process 1600 illustrated in FIG. 16, the backup service receives 1602 a request to restore data stored using the techniques described herein. The backup service then determines 1604 the archival locations of the data based at least in part on the restore request and/or on metadata associated with the restore request. The backup service then will obtain 1606 the restore data from the archival locations using, for example, an archival storage service. The backup service will then reconstruct 1608 full backups of the data from the full backups and/or the incrementals, reconstruct 1610 any required daily backups from the reconstructed full backups and any daily incrementals, and finally provide 1612 the reconstructed data to the originator of the restore request.

Figure 17:
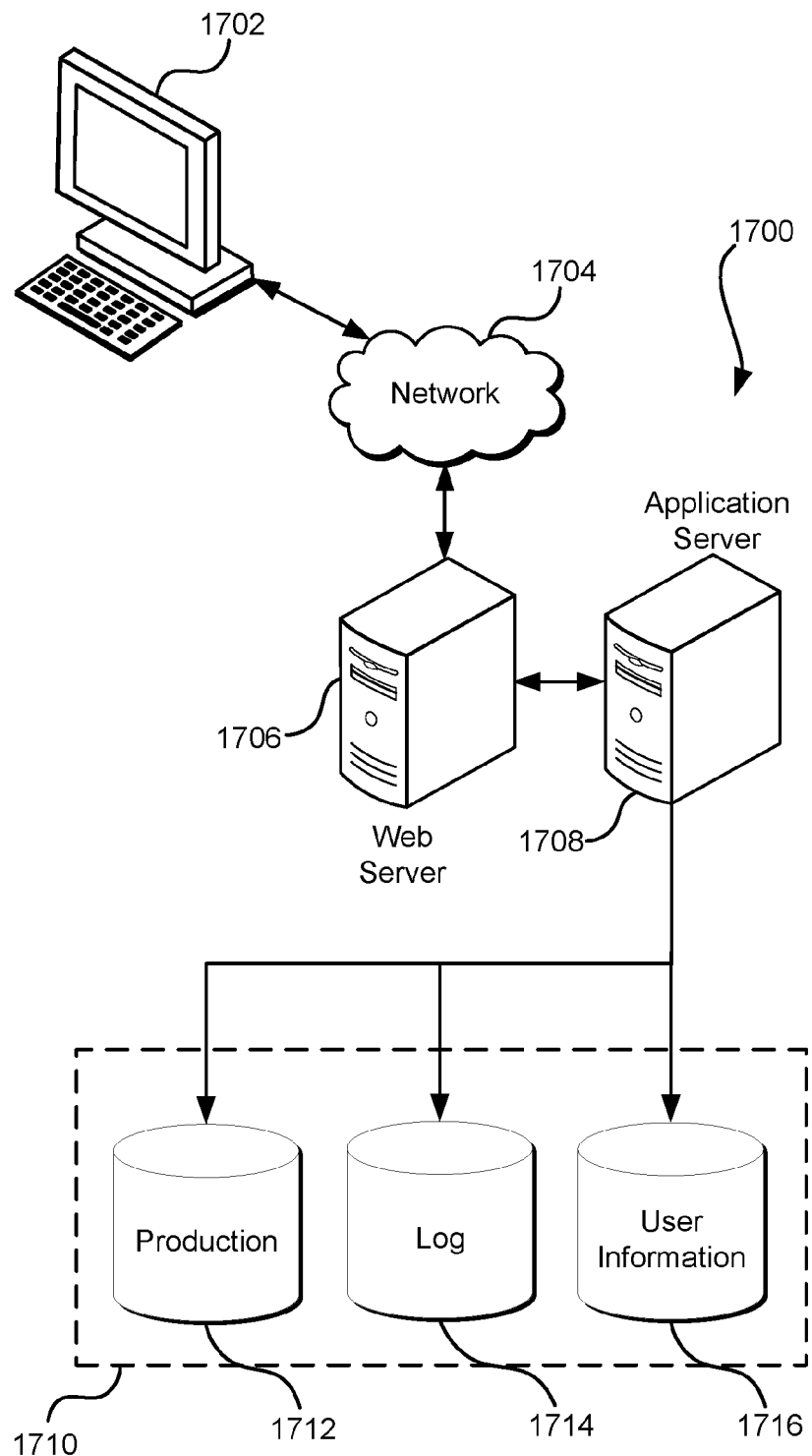
FIG. 17 illustrates an environment in which various embodiments can be implemented.

FIG. 17 illustrates aspects of an example environment 1700 for implementing aspects in accordance with various embodiments. As will be appreciated, although a web-based environment is used for purposes of explanation, different environments may be used, as appropriate, to implement various embodiments. The environment includes an electronic client device 1702, which can include any appropriate device operable to send and/or receive requests, messages, or information over an appropriate network 1704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1706 for receiving requests and serving content in response thereto, although for other networks an alternative device serving a similar purpose could be used as would be apparent to one of ordinary skill in the art.

The illustrative environment includes at least one application server 1708 and a data store 1710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1702 and the application server 1708, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1710 can include several separate data tables, databases, data documents, dynamic data storage schemes, and/or other data storage mechanisms and media for storing data relating to a particular aspect of the present disclosure. For example, the data store illustrated may include mechanisms for storing production data 1712 and user information 1716, which can be used to serve content for the production side. The data store also is shown to include a mechanism for storing log data 1714, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1710. The data store 1710 is operable, through logic associated therewith, to receive instructions from the application server 1708 and obtain, update or otherwise process data in response thereto. The application server 1708 may provide static, dynamic, or a combination of static and dynamic data in response to the received instructions. Dynamic data, such as data used in web logs (blogs), shopping applications, news services, and other such applications may be generated by server-side structured languages, as described herein, or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 17. Thus, the depiction of the system illustrated in example environment 1700 in FIG. 17 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM®, as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method, or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for generating incremental backups, comprising:
   under control of one or more computer systems configured with executable instructions,
      receiving a backup request, the backup request including a location of a set of data to backup, a first time duration, and a second time duration, the second time duration being an integer multiplier of the first time duration, the integer multiplier being at least two;
      generating a set of backup data from the set of data;
      partitioning the set of backup data into a plurality of subsets of the set of backup data, the plurality including a count of subsets, the count of subsets equal to the integer multiplier;
      selecting, for each first time duration, a selected subset of the plurality of subsets, the selected subset selected such that, for each second time duration, each subset of the plurality of subsets is selected one time;

storing a full backup of the selected subset using an archival storage service;

generating a reverse delta for the selected subset, the reverse delta generated from the full backup and a previous full backup of the selected subset, the reverse delta including data that, when combined with the full backup, reconstructs the previous full backup, the previous full backup obtained from the archival storage service;

storing the reverse delta using the archival storage service; and storing, using the archival storage service, an incremental backup for each subset of the plurality of subsets different from the selected subset, the incremental backup for each subset of the plurality of subsets generated from a previous backup of the corresponding subset.

2. The computer-implemented method of claim 1, wherein the previous backup is a previous full backup of the corresponding subset.

3. The computer-implemented method of claim 1, wherein the reverse delta is a bidirectional delta, the bidirectional delta computed by calculating an exclusive OR (XOR) of the full backup and the previous full backup, the bidirectional delta including data that, when combined with the previous full backup, reconstructs the full backup.

4. The computer-implemented method of claim 1, further comprising:

deleting the previous full backup from the archival storage service; and deleting one or more previous incremental backups from the archival storage service, the one or more previous incremental backups selected based at least in part on the second duration.

5. A system, that:

generates, from a set of data to backup, a plurality of data sets that collectively contain sufficient information to reproduce the set of data to backup, the number of data sets in the plurality being a first number that is a positive integer multiple of a second number, the first number corresponding to a backup durability of the set of data to backup and the second number corresponding to a backup period of the set of data to backup;

stores a full backup of a first data set of the plurality of data sets;

stores a reverse delta for the first data set based at least in part on the full backup and a previous full backup of a previous version of the first data set; and stores a set of incremental backups, each incremental backup of the set of incremental backups generated from a corresponding data set of the plurality of data sets different from the first data set, wherein the system comprises hardware components.

6. The system of claim 5, wherein the reverse delta includes data that, when combined with the full backup, reconstructs the previous full backup of the previous version of the first data set.

7. The system of claim 5, wherein the first data set is selected such that, for each backup period, each data set of the plurality of data sets is selected one time.

8. The system of claim 5, wherein:

the system stores the full backup using an archival storage service, the archival storage service configured to store data on a storage medium;

the system stores the reverse delta using the archival storage service; and the system stores the set of incremental backups using the archival storage service.

9. The system of claim 8, wherein the storage medium is a magnetic tape.

10. The system of claim 5, wherein the system marks the previous full backup of the previous version of the first data set for deletion after the system stores the reverse delta for the first data set.

11. The system of claim 5, wherein the system marks one or more previous incremental backups for deletion after the system stores the set of incremental backups, the one or more previous incremental backups selected based at least in part on the backup durability.

12. The system of claim 5, wherein the system:

receives a restore request, the restore request specifying a set of data to restore, the restore request specifying a restore time within the backup durability;

reconstructs a set of restored backups from data obtained from an archival storage service, the number of restored backups in the set of restored backups equal to the integer multiplier, the data obtained from the archival storage service based at least in part on the restore time; and combines the set of restored backup to produce the set of data to restore.

13. A non-transitory computer-readable storage medium having stored thereon executable instructions that, as a result of being executed by one or more processors of a computer system, cause the computer system to:

generate, from set of data to backup, a plurality of data sets that collectively contain sufficient information to reproduce the set of data to backup, the number of data sets in the plurality being a first number that is a positive integer multiple of a second number, the first number corresponding to a backup durability of the set of data to backup and the second number corresponding to a backup period of the set of data to backup;

generate a full backup of a first data set of the plurality of data sets;

generate a reverse delta for the first data set, the reverse delta based at least in part on the full backup and a previous full backup of a previous version of the first data set;

generate a set of incremental backups, each incremental backup of the set of incremental backups generated from a corresponding data set of the plurality of data sets different from the first data set; and cause the full backup, the reverse delta, and the set of incremental backups to be stored.

14. The non-transitory computer-readable storage medium of claim 13, wherein the instructions that cause the computer system to cause the full backup, the reverse delta, and the set of incremental backups to be stored further include instructions that, as a result of being executed by the one or more processors, cause the computer system to cause the full backup, the reverse delta, and the set of incremental backups to be stored using an using an archival storage service.

15. The non-transitory computer-readable storage medium of claim 13, wherein the instructions further comprise instructions that, as a result of being executed by the one or more processors, cause the computer system to:

generate, after a second backup period, a second set of incremental backups, each incremental backup of the second set of incremental backups generated based at least in part on a corresponding data set of the plurality of data sets, the second backup determined such that a second backup durability is equal to the backup period and the second backup durability is a second integer multiplier of the second backup period, the second integer multiplier being at least two; and cause the second set of incremental backups to be stored.

16. The non-transitory computer-readable storage medium of claim 15, wherein the reverse delta is compressed prior to being stored.

17. The non-transitory computer-readable storage medium of claim 13, wherein the instructions further comprise instructions that, as a result of being executed by the one or more processors, cause the computer system to:
  delete the previous full backup; and
  delete one or more previous incremental backups based at least in part on the backup durability.

18. The non-transitory computer-readable storage medium of claim 13, wherein the first data set is selected such that, for each backup durability, each data set of the plurality of data sets is selected one time.

19. The non-transitory computer-readable storage medium of claim 13, wherein the set of data to backup is located in an environment controlled by a customer of the computer system.

20. The non-transitory computer-readable storage medium of claim 13, wherein the each incremental backup for each data set of the plurality of data sets is generated based at least in part on a previous full backup of a previous version of the corresponding data set.

* * * * *